US010567775B2

(12) United States Patent
McAllister

(10) Patent No.: US 10,567,775 B2
(45) Date of Patent: Feb. 18, 2020

(54) METHOD AND SYSTEM OF HARDWARE ACCELERATED VIDEO CODING WITH PER-FRAME PARAMETER CONTROL

(71) Applicant: Intel Corporation, Santa Clara, CA (US)

(72) Inventor: Jeffrey McAllister, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 15/283,321

(22) Filed: Oct. 1, 2016

(65) Prior Publication Data

US 2018/0098083 A1  Apr. 5, 2018

(51) Int. Cl.
*H04N 19/172* (2014.01)
*H04N 19/103* (2014.01)
*H04N 19/156* (2014.01)
*H04N 19/436* (2014.01)

(52) U.S. Cl.
CPC ......... *H04N 19/172* (2014.11); *H04N 19/103* (2014.11); *H04N 19/156* (2014.11); *H04N 19/436* (2014.11)

(58) Field of Classification Search
CPC .. H04N 19/513; H04N 19/117; H04N 19/159; H04N 19/13; H04N 19/124; H04N 19/61; H04N 19/15; H04N 19/184; H04N 19/172
See application file for complete search history.

(56) References Cited

U.S. PATENT DOCUMENTS

| 8,879,636 | B2 | 11/2014 | Graham et al. | |
|---|---|---|---|---|
| 9,215,458 | B1 | 12/2015 | Kjeldaas | |
| 2011/0305273 | A1* | 12/2011 | He | H04N 19/30 375/240.02 |
| 2014/0177704 | A1* | 6/2014 | Pu | H04N 19/70 375/240.02 |
| 2015/0131748 | A1* | 5/2015 | Ono | H04N 19/172 375/240.29 |
| 2015/0271511 | A1 | 9/2015 | Meehan | |
| 2015/0373328 | A1 | 12/2015 | Yennetti et al. | |
| 2016/0065962 | A1 | 3/2016 | Lei et al. | |
| 2017/0078687 | A1* | 3/2017 | Coward | H04N 19/395 |

OTHER PUBLICATIONS

International Search Report & Written Opinion dated Jan. 2, 2018 for PCT Patent Application No. PCT/US17/48865.
International Preliminary Report on Patentability for PCT Application No. PCT/US17/48865, dated Apr. 11, 2019.

* cited by examiner

*Primary Examiner* — Tat C Chio
(74) *Attorney, Agent, or Firm* — Green, Howard & Mughal LLP.

(57) ABSTRACT

Techniques are provided that are related to hardware accelerated video coding with per-frame parameter control.

25 Claims, 13 Drawing Sheets

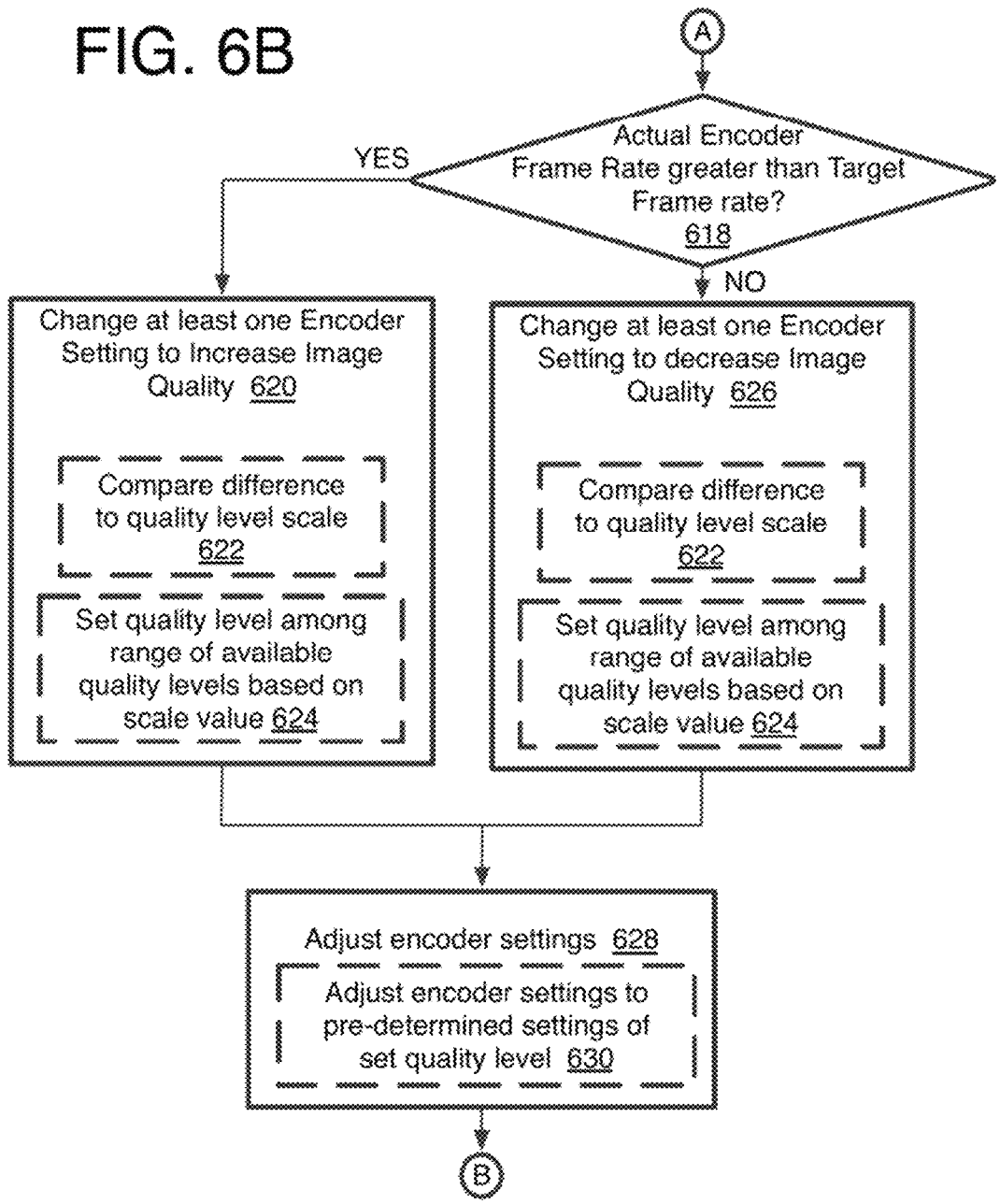

METHOD AND SYSTEM OF HARDWARE ACCELERATED VIDEO CODING WITH PER-FRAME PARAMETER CONTROL

BACKGROUND

Video compression makes it possible to use video data in many different ways. Without it, distribution of video by tape, disk, network, or any other form would be much more difficult. Due to ever increasing video resolutions, and rising expectations for high quality video images, a high demand exists for efficient image data compression of video. Video compression is computationally intense, and requires speed tradeoffs for quality. This is true for any video coding standard format such as Advanced Video Coding (AVC), H.265/HEVC (High Efficiency Video Coding), VP #, and other video coding standards. The aforementioned standards use expanded forms of traditional approaches to address the insufficient compression and/or quality problem, but often the results are still insufficient and require a relatively large amount of computations and time to compute the results. Thus, high resolution encoding is often too slow, and even slower than real time.

One solution to reduce delays caused by encoding is to use graphics hardware accelerators that have special purpose hardware to process large amounts of video coding data. This hardware can frequently process multiple streams faster than real time. Multiple video encode acceleration, however, raises other problems. The accelerator still must process frame data sufficiently fast to permit an encoder to provide frames at a certain target frame rate across multiple encodes. To guarantee these frame rates for all possible inputs, no matter the complexity of the images for example or other variations in image content or delivery, conservative encoder quality/performance tradeoff settings must be used to account for worst case scenarios. This sacrifices opportunities to increase overall quality of the video encode. No mechanism exists to automatically tune the encoder settings based on the rate or latency of image content being processed to maximize quality while maintaining a specified output frame rate across multiple encodes.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIGS. 6A-6B is a flow chart of a method of video coding with frame rate control according to the implementations herein;

DETAILED DESCRIPTION

Figure 1:
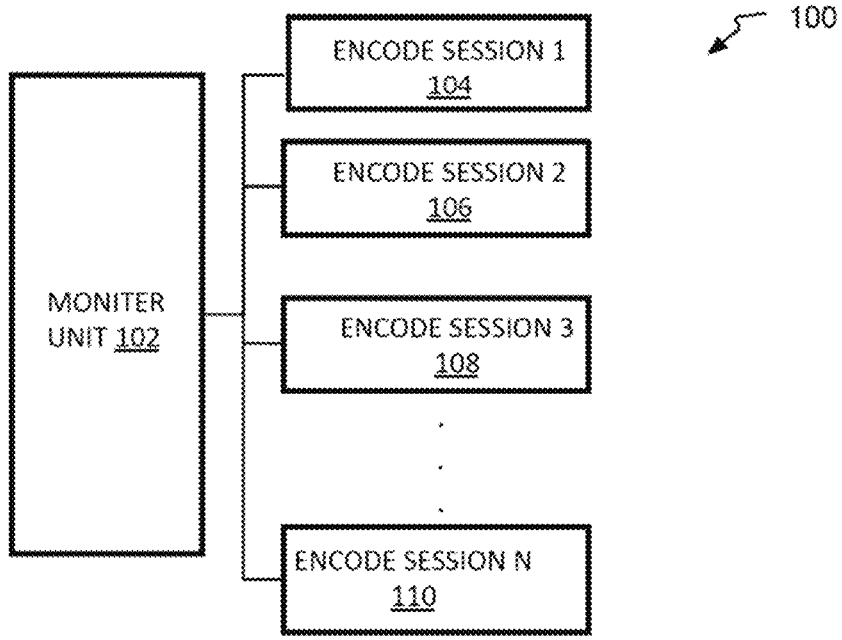
FIG. 1 is a schematic diagram of a video coding device with multiple encoder sessions according to the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless the architecture is particularly limited to structure described herein. For instance, various compute architectures employing, for example, graphics accelerators and/or graphics processing units (GPUs), very large instruction word (VLIW) processors, specialized codec acceleration hardware, etc., may implement the techniques and/or arrangements described herein. Furthermore, while the following description may set forth numerous specific details such as logic implementations, types and interrelationships of system components, logic partitioning and/or integration choices, etc., claimed subject matter may be practiced without such specific details. In other instances, some material such as, for example, control structures and full software instruction sequences, may not be shown in detail in order not to obscure the material disclosed herein.

When not specifically mentioned, the material disclosed herein may be implemented in hardware, firmware, software, or any combination thereof. Some of the material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, mediums, and methods are described below related to hardware accelerated video coding with per-frame parameter control according to the implementations herein.

Conventionally, the level of quantization (QP or quantization parameter) is adjusted to maintain a bitrate. When QP is high, most pixel data is discarded. As quantization (QP) is reduced more pixel data is retained. Since the number of bits required to compress a sequence of frames is highly dependent on aspects of content like motion complexity, scene changes, etc., QP itself is not sufficient to set a bitrate. A feedback mechanism must be added to dynamically adjust to content. Traditional bitrate control methods such as VBR (variable bit rate) adjust QP to maintain a target bitrate. If frame sizes are too high QP is increased (decreasing quality) and if frame sizes are trending below the bitrate target QP is decreased (increasing quality). This feedback mechanism can increase bitrate predictability as well as quality at a given target bitrate as compared to setting a constant QP.

As mentioned, however, graphics accelerators and similar architectures now offer specialized hardware that can perform multiple simultaneous encodes faster than real time. However, just as bits per frame at a given QP setting is content dependent, the number of frames per second which can be processed by an encoder changes based on content complexity. A control mechanism such as described here can maximize quality when the number of frames encoded per second per encoder is constrained to a target.

Graphics accelerators, also referred to herein as graphics processing units (GPUs), or similar specialized hardware raise difficulties with providing a target frame rate across multiple encodes. Maintaining a target frame output rate across multiple encodes is desired for use cases like live streaming because players for that data need to receive new frames at a steady rate. For batch encodes an overall rate of encode must be maintained to finish multiple encodes within an allotted time (for example, a set of videos must be transcoded before the next batch arrives). A live encoder usually provides compressed frames at or near the target frame rate so that the frames can be delivered over a bitstream in a just-in-time type of system so that the memory at a decoder, such as a jitter buffer, is not overwhelmed, and in a sufficient speed to provide a timely, continuous display of the video sequence. The decoder will retrieve frames from the buffer at a speed related to the display frame rate. While the rate at which frames are delivered varies due to network issues, delays caused by large computation durations or settings at the encoder can equally cause variations in the delivery frame rate. When frames are delivered too early, a buffer at the decoder may drop the frames if the buffer is too full, and when frames are too late, the frames cannot be displayed in time. Either way, frames being provided at an actual encoder frame rate and delivered at relatively large variations from a target frame rate may cause jumpy motion from frame to frame, or even pauses or display freezes that are noticeable to the user.

One known solution is to set the encoder settings and encoder frame rate at each of the multiple encoder units to provide frames at a target frame rate set to compensate for a worst case scenario. Such a worst case scenario assumes frames have complex images and are provided with some maximum amount of processing per frame, such as by using more brute matching searches and/or assuming less zero motion vectors or skip blocks when determining motion vectors for motion estimation rather than using short-cut algorithms or searches. Such search algorithms also may use more spatial pixel data on the same frame as a block being analyzed requiring the system to first wait for analysis (and motion vectors) of reference blocks to be provided before processing the motion vector of a current block. All of these type of worst case scenario assumptions, when a frame may be very simple for example, underutilizes the system capability. This results in wasting system capability for sequences of video that are simpler and/or faster to encode than the worst case.

To resolve these issues, the algorithm complexity settings related to quality tradeoffs at the encoder can be adjusted automatically so that the actual frame rate or latency resulting from use of separate encoder units (or the group of encoder units as a whole) at an accelerator may better match the target encoder output frame rate or latency, dynamically adjusting to changes in content or other performance variations. Capacity is the number of concurrent encodes (including transcodes) which can be processed faster than a "real time" threshold configurable similarly to target bitrate. Capacity (or rate at which frames appear from the encoder) is measured by monitoring the time between when new frame bitstream output for each encoder becomes available to the system. Latency is the duration for encoding a frame including from when a frame is considered to have entered the encoder to when it is available in the output bitstream. Transcoding herein refers to a complete coding cycle including decode of an original sequence, frame processing, and encoding.

Referring to FIG. 1, a video coding device 100 may have a monitor unit 102 to monitor the frame capacity and latency over a group of encodes or encode sessions 104 to 110 (numbered 1 to N) where each encode session is being performed at least partially in parallel to the other encode sessions. Each encode session may include operations from pre-processing when the frame data is obtained all the way through encoding until compressed data is placed into bitstreams. Some of the encoding operations of an encode session are performed by software (and a CPU for example) and shared common fixed function hardware on an accelerator. Other encoding operations of an encode session, however, may be performed by separate encoder units operating in parallel. These encoder units may be formed by parallel hardware slices or hardware sub-slices on a graphics accelerator or GPU for example. By one form, each encoder unit is assigned a different frame than the frames assigned to other encoder units. The details are explained below with FIG. 3.

When the actual frame rate or latency of an encode session 104 to 110 strays too far from a target frame rate or latency respectively, the encoder quality and/or encode time tradeoff setting(s) may be automatically adjusted to return the system to the target. By one approach, the encoder settings are pre-arranged into a set of numeric quality levels, where a range of encode time versus quality parameters are provided. When the readings from the monitor unit 102 indicates the frame rate or latency associated with at least one of the encoder units should be adjusted toward a target, the encoder quality level may be changed on all of the encoder units or just the particular encoder unit that had an actual value (frame rate or latency) to target value difference sufficiently large to trigger the adjustment. The details are provided below.

Figure 2:
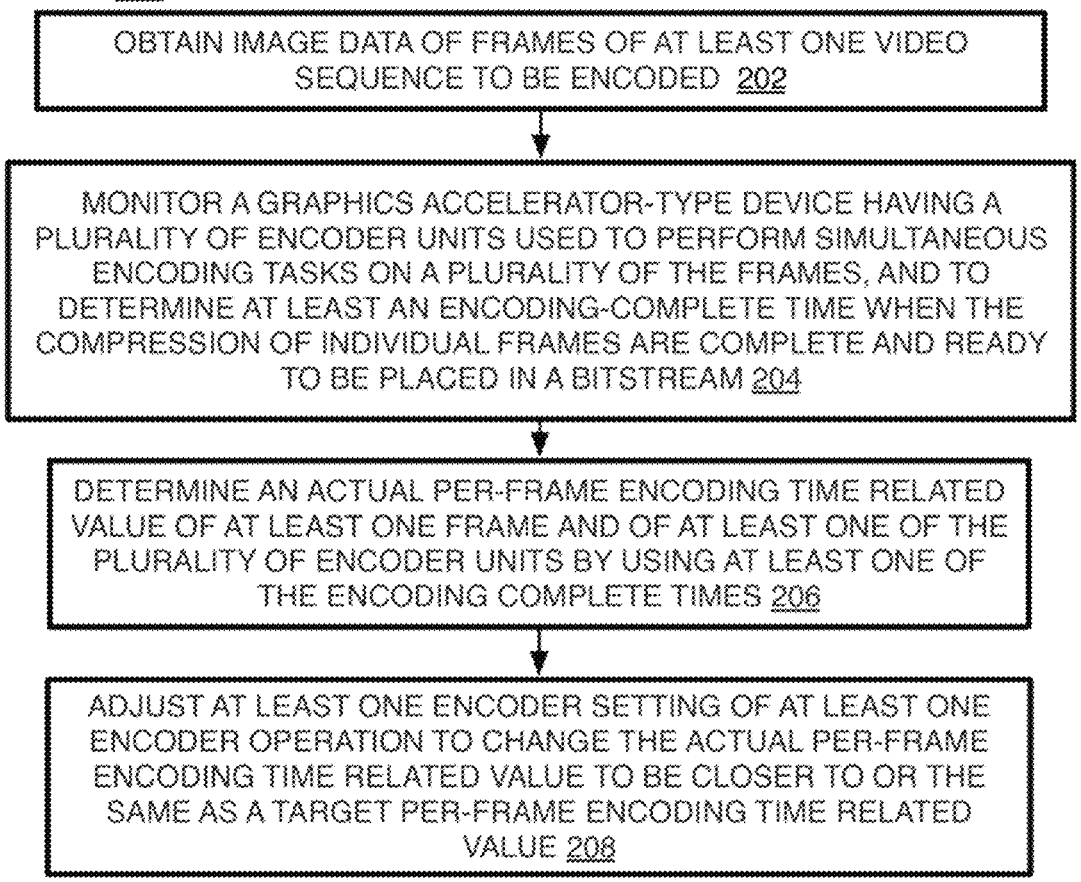
FIG. 2 is a flow chart of a method of video coding with per-frame parameter control according to the implementations herein.

Referring now to FIG. 2, an example process 200 is arranged in accordance with at least some implementations of the present disclosure. In general, process 200 may provide a computer-implemented method of hardware accelerated video coding with per-frame parameter control. In the illustrated implementation, process 200 may include one or more operations, functions or actions as illustrated by one or more of operations 202 to 208 numbered evenly. By way of non-limiting example, process 200 may be described herein with reference to operations discussed with respect to FIGS. 6A-6B, 8A-8B, and 10 herein and may be discussed with regard to example systems 100, 300, 400, 500, or 1100 discussed herein.

The process 200 may comprise "obtain image data of frames of at least one video sequence to be encoded" 202, and as described below may include receiving raw image data with at least some pre-processing, such as de-mosaicing, de-noising, and so forth, completed so that the image data is at least ready to be provided for encoder-specific pre-processing such as color space or dynamic range conversions.

The process 200 may comprise "monitor a graphics-accelerator type device having a plurality of encoder units used to perform simultaneous encoding tasks of a plurality of the frames, and to determine at least an encoding-complete time when the compression of individual frames are complete and ready to be placed in a bitstream" 204. Thus, this refers to those single die devices, such as a system on a chip (SoC), with individual hardware slices or sub-slices where each such division may be considered to be an encoder unit that performs at least some encoding tasks for an encoding session. Such tasks may include bitrate control, motion estimation, intra estimation, and prediction mode selected by one example. When the encode session that uses an encoder unit has generated a compressed frame and overhead (including the pixel image data, residuals, motion vectors, and so forth needed to de-compress that frame) and that is, or is ready to be, placed in packets for placement in a bitstream, the time, clock, or timestamp of the frame is noted. Such encoding-complete time can be determined by measuring time elapsed between emergence of the current frame from the encoder and emergence of the previous frame. This may be repeated for each or multiple individual frames. As discussed below, this may be all that is needed to monitor a per-frame rate from each encoder. However, the time between when an uncompressed frame enters the encoder and when the encoded bitstream for that frame emerges from the encoder can also can be monitored to determine latency as described herein.

Process 200 may include "determine an actual per-frame encoding time related value of at least one frame and of at least one of the plurality of encoder units by using at least one of the encoding-complete times" 206. Specifically, and described in detail below, the encoding-complete time of multiple frames may be used to determine an actual capacity or frame rate of an encode session, and in turn, the encoder unit associated with that encode session. The actual value may be the minimum frame rate among the frame rates from a group of frames such as a group of consecutive frames or consecutive frames using the same encoder unit. This actual frame rate value will then be used for comparison to a target frame rate. This may be performed for each encoder unit receiving the frames. While it was mentioned to use a minimum frame rate to target values, it will be understood that the group of frames could be consecutive frames or separated by some interval, random, or otherwise, but could be all frames of a video sequence. Also, alternatively, it will be understood that the actual frame rate could be some median, average, or other combination of the capacities or latencies. For frame rate, it also will be understood that a value representing the frame rate can be used. For example, the time interval between a current frame and a next frame may represent the actual frame rate to be used to compare to the target value (which also would be a target time interval) rather than dividing one second by the interval in order to compute the actual frame rate in FPS for example.

Alternatively, or additionally, the system may determine latency of individual frames by also monitoring the time between when frames enter an encoder and when they exit across a group of encoders. In this case, a maximum latency of the latencies of a group of frames is used to represent the group of frames as with the actual frame rate value, but could be a different value than the maximum value as described above with the frame rate. The encoding-start time may be a set pre-processing point or point when a certain version of the frames are saved at an input buffer or retrieved from such an input buffer to begin core encoding operations such as partitioning of the frames. Otherwise, the encoding-start time could be set before or after a certain pre-processing operation such as after format conversion for compatibility with the encoder (such as color space or dynamic range conversion). The actual latency is determined as the difference between the encoding-start time and encoding-complete times.

Process 200 also may include "adjust at least one encoder setting of at least one encoder operation to change the actual per-frame encoding time related value to be closer to or the same as a target per-frame encoding time related value" 208. This operation may include respectively comparing the actual capacity (or output frame rate) and/or latency to target frame rate and/or latency respectively. When the actual frame rate is less than the target value, the encoder unit is operating too slowly. To compensate for this and bring the actual frame rate closer to the target capacity, the quality settings of the encoder may be reduced to lower the frame quality and increase the frame rate. The opposite may be performed when the actual capacity is above the target capacity. When the actual latency is below (or smaller than) the target latency, the encoder unit is operating too fast and the quality of the frames can be raised to enlarge the actual latency to be closer to or the same as the target latency, and the opposite will be applied when the actual latency is larger than the target latency.

Once the difference between the actual and target values are determined, the encoder settings can be adjusted to compensate. By one example form, this may involve predetermining multiple quality levels on a numeric scale that the encoder can automatically adjust to depending on a desired quality level. By one form, seven levels are set with level one as the best quality (and slowest) and level seven as the least quality (and fastest). The encoder settings that are adjusted may include many different encoder feature or setting combinations. This may include adjusting the thoroughness of the motion estimation search such as turning sub-pixel search on or off or limiting search to partition types, using weighted predictions for motion compensation, and so forth. Otherwise, bitrate control hypothetical reference decoder (HDR) conformance can be relaxed or strengthened, quantization parameter could be adjusted or trellis quantization could be turned off, and certain frame types (such as B-frames that may use multiple reference frames) could be turned on or off, or otherwise the number of reference frames could be limited. Thus, the same encoding setting may have different values for different levels, and/or different types of encoder settings are modified form frame to frame. Many other alternatives are contemplated, and it will be understood that any one or combination of these features (or encoder setting types) may be adjusted together. More details are provided below.

Figure 3:
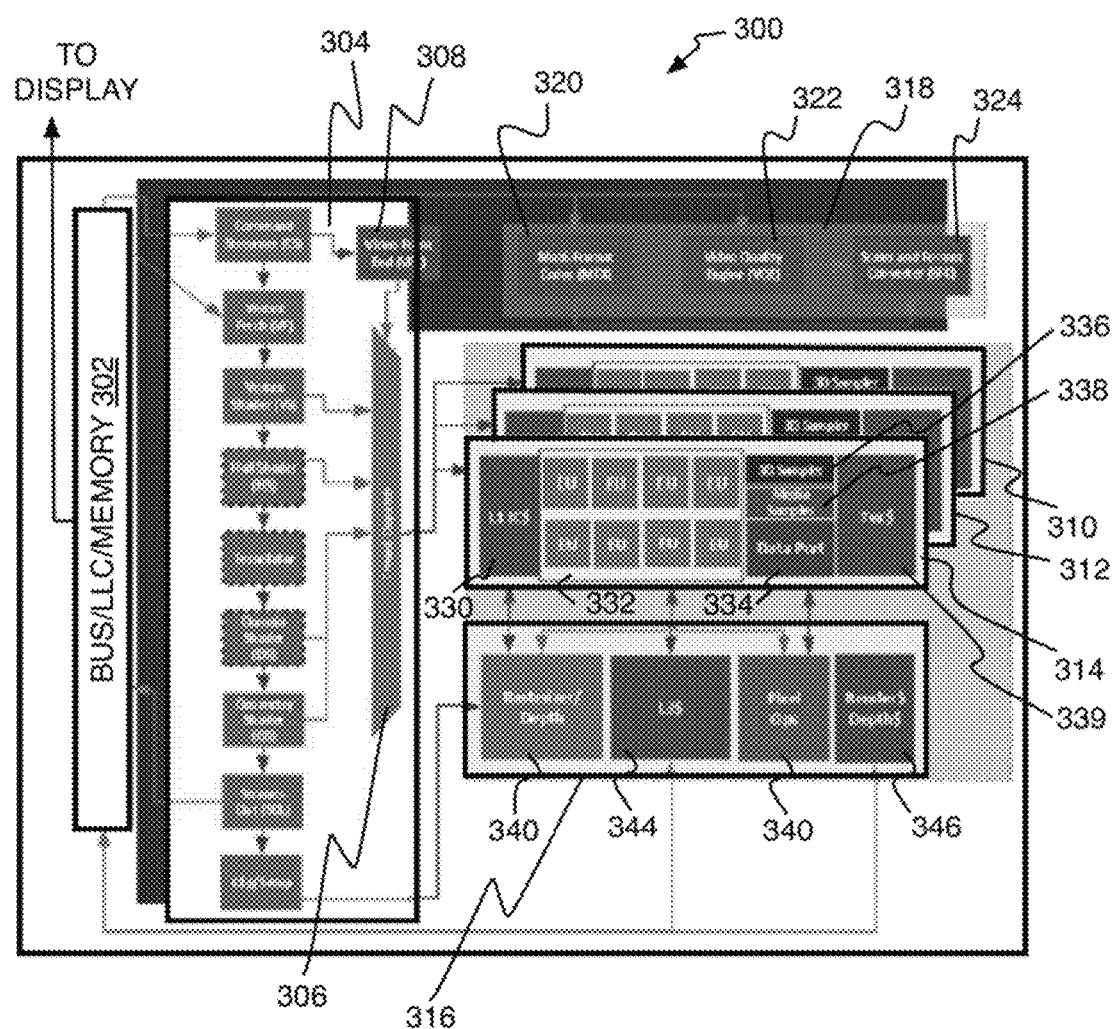
FIG. 3 is a schematic diagram of a hardware accelerator to provide multiple encoder units in accordance with the implementations herein.

Referring to FIG. 3, an example video coding system or device 300, such as a graphics accelerator or graphics processing unit (GPU), is provided to include one example hardware architecture with multiple encoder units and fixed function hardware that can be used to implement the methods of video coding with per-frame parameter control as described herein. Such hardware accelerator architecture may be similar to that known as Intel® Iris™ Graphics, Sandybridge™, Ivybridge™, Haswell™, Broadwell™, and Skylake™ to name a few examples. Only those components relevant to the methods described herein are described in detail.

The image data may be retrieved for processing via a ring or other type of bus and as indicated provides channels to and from a last level cache (LLC) and other temporary and/or external memory referred to collectively as the bus/LLC/memory 302. A global unit 304 has a number of graphics related modules that perform 3D graphics tasks, not particularly relevant here, and may use the slices that form encoder units. A thread dispatch 306 is a command streamer that reads in commands and manages data flow among the components on the device 300. A video front end 308 is also present but is not particularly relevant here warranting explanation.

The device 300 also has a number of sub-slices 310 to 314 numbered 1 to N where each such sub-slice may be considered an encoder unit. The sub-slices each have L1 instruction cache (L1 IC$) 330, and multiple execution units (EUs) 332 such as eight or ten each with its own processor and multiple threads. The EUs may be SIMD processors by one example. A 3D texture sampler 339 and texture cache (Te$) 336 for graphics are also provided on the sub-slice as well as a media sampler 338 that provides access to video memory pixels and data port 334 that may hold a number of local buffers for immediate processing of data. The sub-slices providing the encoder units may alternatively perform many different tasks that are not necessarily encoding.

The sub-slices that communicate with a slice common 316 together form a full slice. The slice common 316 may include at least execution units, but in this case also may include a rasterizer/depth unit 340, a pixel ops unit 342 not used for operations relevant here, and a L3 cache (L3$) 344, and a render and depth cache 346 as additional local memories.

A fixed function hardware section 318 may include a multi-format codec (MFX) unit 320 that performs a number of different VDBOX (video encode and/or decode) and VEBOX (video enhancement) tasks that are not performed by the encoder units, a video quality engine (VQE) 322 that enables low power video processing, and a scaler and format converter (SFC) unit 324 that performs pixel reconstruction such as scaling to certain resolutions or converting to certain color spaces, and so forth. By one form, and relevant here, while the encoder units 310 to 314 perform rate control, motion estimation, intra estimation, and prediction mode selection, the fixed function section 318, and particularly the MFX unit 320 may perform motion compensation, intra prediction generation, forward quantization, and entropy coding.

Data received through the bus is provided to an encoder unit 310 to 314. Depending on encoder settings, work may be scheduled on each of the EUs. By one example, the accelerator 300 may programmed so that the image data and encoding of a single frame of a video sequence is assigned to a single encoder unit. While the present methods could work when encoding tasks for a single frame (broken into frame slices for example) could be processed by multiple encoder units, such a system would adjust settings on all encoder units versus individual encoder units as described herein. Thus, going forward it is assumed the encoder units each receive data of a different frame than the other encoder units.

As mentioned, a single encode session may include some pre-processing tasks that may or may not be performed by use of the encoder units, then core encoding tasks some of which are performed by the encoder units and some of which are performed by shared fixed function hardware in the form the MFX and including entropy coding. Placement of the compressed frames then may be performed by a CPU (see FIGS. 11-12). Thus, the encoding of frames on one encode session, and in turn on one encoder unit, can proceed independently from the encoding on other encoder units except for when one encoder unit must wait for data from the shared fixed function section 316, or when one encoder unit must wait for reference frame data from another encoder unit. Specifically, when motion estimation is being performed and an encoder unit needs the image data from a reference frame, one encoder unit may need to wait for another encoder unit to process that reference frame. Such delay may cause a reduction in the actual frame rate and latency at the waiting encoder unit causing a variation in these parameters.

Figure 4:
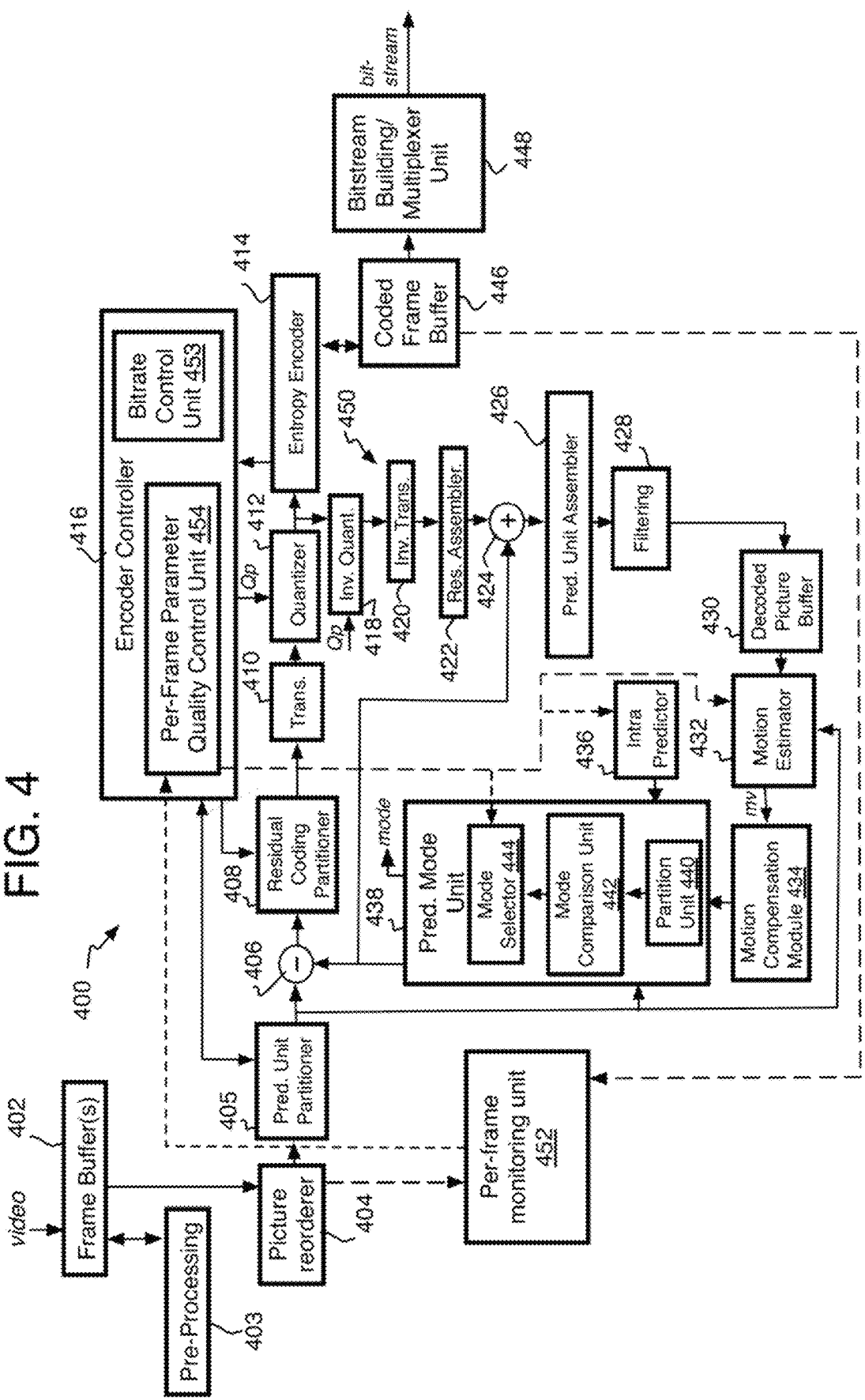
FIG. 4 is a schematic diagram of an example encoder for an image processing system.

Referring to FIG. 4, an example video coding system 400 may be or have an encoder that may be implemented by hardware accelerator 300 for example, and where current video information in the form of data related to a sequence of video frames may be received for compression. The system 400 may be receiving raw image data of video frames of a video sequence that may be first placed in a memory or frame buffer 402, such as RAM, DRAM, or other type of RAM, or could be cache as well. The system 400 then may perform pre-processing at a pre-processing unit 403. This may first include de-mosaicing, de-noising, and so forth. This also may include pre-processing that includes conversion between a certain color space, dynamic range, or resolution format. Those pre-processed frames that are now ready for compression or core encoding may be placed in the frame 402 buffer again or a different buffer that is considered an input picture buffer. The frame buffer 402 may be, or may be in the same memory as, the frame buffer that holds the frame data in various intermediate versions as the frame is being encoded until placed in a bitstream. Many variations are possible. The system 400 then may include an optional picture reorderer 404 which places frames in coding order when different from the recorded and display order. For example, a video sequence may be in I, B, B, P order for display but is retrieved from the input buffer in I, P, B, B coding order for coding first I-frames (that do not use other reference frames), then the P-frame (that uses the I-frame as a reference frame), and finally the B-frames that use the P and I frames as reference frames.

The storage of any of these versions of the frames from initial receipt of raw image data to the storage of pre-processed frames in the input picture buffer, or the retrieval from the input picture buffer or other buffer may be considered the encoding-start time for measuring latency. By one approach, latency is measured from a time a frame enters the encoder through all stages such as placement in local memory, motion search, macroblock type search, CABAC, bitstream packing and other steps until the compressed output bitstream for that frame becomes available.

The system 400 also may have a prediction unit partitioner 405 that divides the frames into blocks or other partitions such as image slices for coding standards such as high efficiency video coding (HEVC). Otherwise the system 400 may have a subtraction unit 406, a residual partitioner 408, a transform unit 410, a quantizer 412, an entropy encoder 414, and an encoder controller 416. The controller 416 manages many aspects of encoding including rate distortion or selection of correct motion partition sizes, correct coding partition size, best choice of prediction reference types, and best selection of modes as well as managing overall bitrate to name a few examples. The encoder controller also may have a per-frame parameter quality control unit 454 that adjusts encoder settings depending on a per-frame parameter such as frame rate (or capacity) and/or latency values determined by per-frame monitoring unit 452 that may be similar to monitor 102 (FIG. 1). This is explained in detail below.

The output of the quantizer 412 may be provided to a decoding loop 450 provided at the encoder to generate the same reference or reconstructed blocks, frames, or other units as would be generated at the decoder. Thus, the decoding loop 450 may use inverse quantization and inverse transform units 418 and 420 to reconstruct the frames, and residual assembler 422, adder 424, and prediction unit assembler 426 to reconstruct the units used within each frame. The decoding loop 450 then provides filters 428 to increase the quality of the reconstructed images to better match the corresponding original frame. This may include a deblocking filter, a sample adaptive offset (SAO) filter, and a quality restoration (QR) filter. The decoding loop 450 also may have a decoded picture buffer 430 to hold those frames to be used as reference frames for inter-prediction.

The encoder 400 also has a motion estimation module or unit 432 that provides motion vectors as described below, and a motion compensation module 434 that uses the motion vectors to form prediction blocks. The motion estimation unit 432 and motion compensation module 434 form the inter-prediction capability of the encoder. The motion estimator 432 may use a variety of techniques to form the motion vectors including block matching such as brute integer or fractional block matching, hierarchical motion estimation (HME), spatial dependencies, and zero motion vectors (ZMVs). An intra-frame prediction module 436 provides the intra-prediction capability. Both the motion compensation module 434 and intra-frame prediction module 436 may provide predictions to a prediction mode unit 438.

The prediction mode unit 438 selects the best prediction mode for a particular block. It may compare inter-prediction based predictions of different sub-block arrangements for a single block, an intra-prediction based prediction (which also may include comparing multiple sub-block arrangements), and a skip. The mode selector 438 may have a partition unit 440 to determine when and which sub-block arrangements are to be considered, a mode comparison unit 442 to perform the actual comparisons, and then a mode selector 444 to make the best prediction decision based on the comparison outcomes.

As shown in FIG. 4, the prediction output of the selector 438 in the form of a prediction block is then provided both to the subtraction unit 406 to generate a residual, and in the decoding loop to the adder 424 to add the prediction to the residual from the inverse transform to reconstruct a frame. A PU assembler (not shown) may be provided at the output of the prediction mode unit 438 before providing the blocks to the adder 424 and subtractor 406 for HEVC or other standard operation.

More specifically, the video data in the form of frames of pixel data may be provided to the input picture buffer 402. The buffer 402 holds frames in an input video sequence order, and the frames may be retrieved from the buffer in the order in which they need to be coded. For example, backward reference frames are coded before the frame for which they are a reference but are displayed after it. The input picture buffer also may assign frames a classification such as I-frame (intra-coded), P-frame (inter-coded, predicted from a previous reference frames), and B-frame (inter-coded frame which can be bi-directionally predicted from a previous frames, subsequent frames, or both). In each case, an entire frame may be classified the same or may have slices classified differently (thus, an I-frame may include only I slices, P-frame can include I and P slices, and so forth). In I slices, spatial prediction is used, and in one form, only from data in the frame itself. In P slices, temporal (rather than spatial) prediction may be undertaken by estimating motion between frames but also may include spatial dependencies to derive motion vectors. In B slices, and for HEVC, two motion vectors, representing two motion estimates per partition unit (PU) (explained below) may be used for temporal (and spatially dependent MV) prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

Specifically, when an HEVC standard is being used, the prediction partitioner unit 405 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block also may be divided into coding units (CU) in quad-tree split scheme. Further, each leaf CU on the quad-tree may either be split again to 4 CU or divided into partition (or prediction) units (PU) for motion-compensated prediction. In various implementations in accordance with the present disclosure, CUs may have various sizes including, but not limited to 64×64, 32×32, 16×16, and 8×8, while for a 2N×2N CU, the corresponding PUs also may have various sizes including, but not limited to, 2N×2N, 2N×N, N×2N, N×N, 2N×0.5N, 2N×1.5N, 0.5N×2N, and 2.5N×2N. It should be noted, however, that the foregoing are only example CU partition and PU partition shapes and sizes, the present disclosure not being limited to any particular CU partition and PU partition shapes and/or sizes.

As used herein, the term "block" may refer to a CU, or to a PU of video data for HEVC and the like. By some alternatives, this may include considering the block a macroblock or a division of a macroblock of video or pixel data for H.264/AVC, VP8, VP9, and the like, unless defined otherwise.

Also in video coding system 400, the current video frame divided into LCU, CU, and/or PU units may be provided to both the motion estimation unit or estimator 432 and the prediction mode unit 438. System 400 may process the current frame in the designated units of an image in raster or different scan order such as waveforms. When video coding system 400 is operated in inter-prediction mode, motion estimation unit 432 may generate a motion vector in response to the partition selection by the prediction mode unit 436, the current video frame, and a reference video frame.

A number of different block-based search methods are described herein and may be used to match a block of a current frame with one or more candidate blocks on a reference frame, and thereby determine a motion vector to be encoded for a prediction block. Otherwise, other motion estimation methods to determine a motion vector may be used that reduce the need for block matching at an individual block including the spacial dependency methods, using a ZMV, or even using the motion vector of blocks on a previous frame to name a few examples. The motion compensation module 434 then may use the reference video frame and the motion vector provided by motion estimation module 432 to generate the predicted blocks or predicted frame, and provide these predictions to the prediction mode unit 438.

In the partition unit 440 of the prediction mode unit 438, by one example for HEVC, if the size of a CU is 2N×2N, a request is sent to the motion estimation unit to provide MVs for multiple block sub-divisions so that the mode comparison unit 442 can check the Lagrangian cost function of predictions using multiple or exhaustively all modes in a level such as 2N×2N, 2N×N, N×2N, N×N, 3N/4×2N, N/4× 2N, 2N×3N/4, 2N×N/4. By one example, the Lagrangian cost function is determined for each mode by converting bits into a distortion using a Lagrangian multiplier. The Lagrangian cost function may be defined for a mode selection where resultant bits R and a distortion D are determined by a mode for each CU. The best prediction mode of a level is selected based on the minimum value of the cost function. By one example, if any prediction mode except N×N is selected then the selected mode is the final mode for the CU. If N×N is selected in the top level of the coding tree based on the cost function, then N×N/2, N/2×N, N/2×N/2, 3N/4× N, N/4×N, N×3N/4, and N×N/4 modes are checked against the cost function of the N×N mode. If N/2×N/2 mode provides minimum cost function, then the next lower level is also tested. Otherwise, by one example, the final decision is taken in the N/2×N/2 level of the coding tree.

The best predicted block from the prediction mode unit 438 then may be subtracted at subtractor 406 from the current block, and the resulting residual, when present, is provided to the residual coding partitioner 408. Coding partitioner 408 may partition the residual into one or more blocks, and by one form for HEVC, dividing CUs further into transform units (TU) for transform or further compression, and the result may be provided to a transform module 410. The relevant block or unit is transformed into coefficients using variable block size discrete cosine transform (VBS DCT) and/or 4×4 discrete sine transform (DST) to name a few examples. Using the quantization parameter (Qp) set by the controller 416, the quantizer 412 then uses lossy resampling or quantization on the coefficients. The generated set of quantized transform coefficients may be reordered and entropy coded by entropy encoder module 414 to generate a portion of a compressed bitstream (for example, a Network Abstraction Layer (NAL) bitstream) provided by video coding system 400. The entropy encoder 414 may retrieve the quantized coefficients and save fully coded frames ready for the packetization and bitstream in a coded (or compressed or encoded) frame buffer (CFB) 446. In various implementations, a bitstream provided by video coding system 400 may include entropy-encoded coefficients in addition to side information to be used to decode each block (e.g., prediction modes, quantization parameters, motion vector information, partition information, in-loop filtering information, and so forth), and may be provided to other systems and/or devices for transmission or storage. The frame data is then retrieved from CFB 446 by a bitstream building/multiplexer unit 448 to packetize the frame data and place it in a bitstream along with audio data that accompanies the video sequence when present.

The output of the quantization module 412 also may be provided to de-quantization unit 418 and inverse transform module 420 in a decoding loop. De-quantization unit 418 and inverse transform module 420 may implement the inverse of the operations undertaken by transform unit 410 and quantization module 412. A residual assembler unit 422 may then reconstruct the residual CUs from the TUs. The output of the residual assembler unit 422 then may be combined at adder 424 with the predicted frame to generate a rough reconstructed block. A prediction unit (LCU) assembler 426 then reconstructs the LCUs from the CUs to complete the frame reconstruction.

The reconstructed frames are filtered, and then provided to a decoded picture buffer 430 where the frames may be used as reference frames to construct corresponding predictions for motion estimation and compensation as explained herein. When video coding system 400 is operated in intra-prediction mode, intra-frame prediction module 436 may use the reconstructed pixels of the current frame to undertake intra-prediction schemes that will not to be described in greater detail herein.

As to the operation of the per-frame monitoring unit (or just monitor unit) 452, by one example, the monitor unit 452 determines when frames are fetched from the input buffer 402 in coding order by the picture reorderer 404 and provided to the prediction unit partitioner 405 in order to determine an encoding-start time to measure latency when a latency duration is needed. As mentioned, the encoding-start time could be defined at different points near the initial encoding process and where practical or advantageous. Otherwise, for both capacity (or frame rate) and latency, the monitor unit 454 determines an encoding-complete (or end) time by determining the time at which compressed frames are placed in the coded frame buffer (CFB) 446 that holds frames in a version that is compressed and is ready to be placed in packets and then into a bitstream for example. The encoding-complete time can alternatively be set at any point near the completion of the encoding process including versions that are processed by the bitstream building unit 448 or before entropy coding to name some alternative examples.

Next whether performed by the monitor unit 452 or the per-frame parameter quality control unit 454, the frame rate in the form of a representative actual frame rate value (or interval value) such as a minimum actual frame rate representing a group of frames and determined by using the time interval between two consecutive frames or a sequence of frames is compared to a target frame rate. Alternatively, the encoding-start times and encoding-complete times of individual frames are subtracted to form an actual frame latency, and the maximum actual latency among latencies from a group of frames is compared to a target latency. Depending on the size and direction of the difference between the actual value and the target value, a desired predetermined quality level, here one to seven predetermined quality levels, is indicated and that each corresponds to certain quality settings at the encoder.

By one approach, the quality level is provided to, or otherwise generated at, the per-frame parameter quality control unit 454, which then adjusts the encoder settings for each feature associated with the level thereby adjusting the algorithm complexity. Higher complexity means better quality at the cost of lower frame rate and/or higher latency. As explained in detail below, this may involve adjusting quantization, intra-prediction, inter-prediction settings, bitrate conformance settings, or settings of other features to raise or lower the quality of the images, and in turn, modify the frame rate and/or latency of individual frames to raise or lower the per-frame speed of the encoder. It will be understood that the per-frame parameter quality control unit 454 may be considered separate from the encoder controller 416 and may be considered a part of another component of device 400 whether or not considered part of an encoder or encoder unit. Thus, a separate per-frame parameter quality control unit 454 may be provided for each encoder unit or may be associated with multiple or all encoder units on a single graphics accelerator for example.

In some examples, video coding system 400 may include additional items that have not been shown in FIG. 4 for the sake of clarity. For example, video coding system 400 may include a processor, a network, a radio frequency-type (RF) transceiver, splitter and/or multiplexor, a display, and/or an antenna. Further, video coding system 400 may include additional items such as a speaker, a microphone, memory, a router, network interface logic, and so forth. Some of these components are shown on other implementations described herein.

Figure 5:
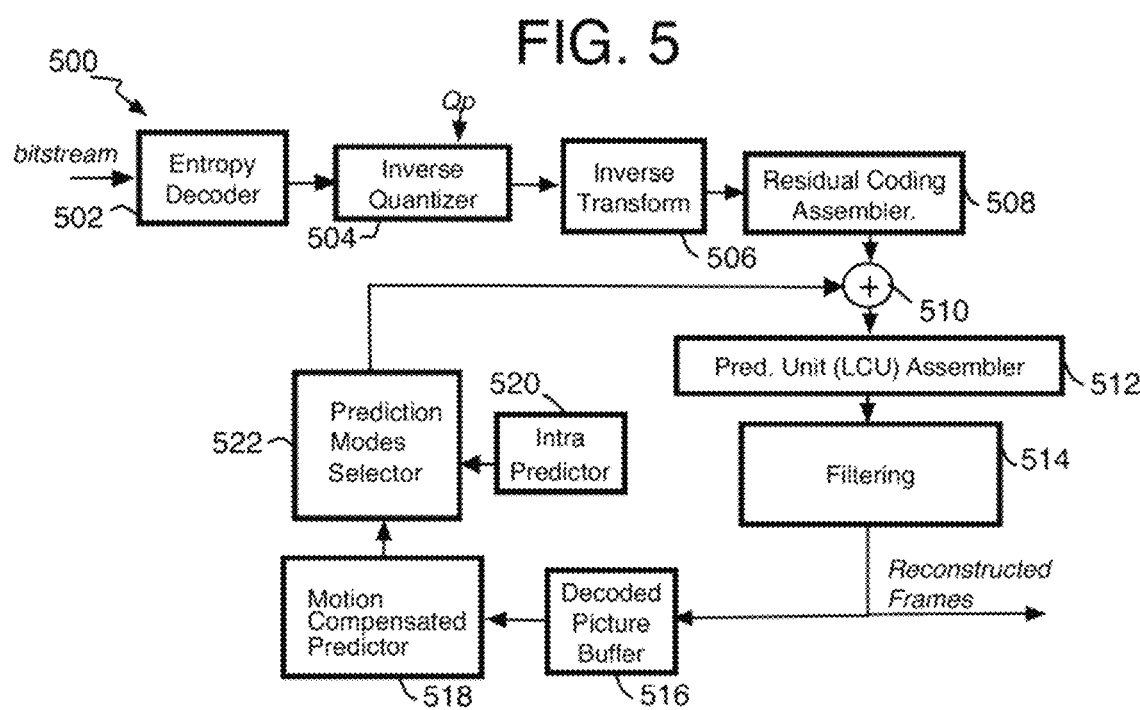
FIG. 5 is a schematic diagram of a decoder for a video coding system.

Referring to FIG. 5, a system 500 may have, or may be, a decoder, and may receive coded video data in the form of a bitstream and that has residuals, motion vectors, block partitions, and prediction modes for individual blocks. The system 500 may process the bitstream with an entropy decoding module 502 to extract quantized residual coefficients as well as the motion vectors, prediction modes, partitions, quantization parameters, filter information, and so forth. The system 500 then may use an inverse quantizer module 504 and inverse transform module 506 to reconstruct the residual pixel data. The system 500 then may use a residual coding assembler 508, an adder 510 to add the residual to the predicted block, and a prediction unit (LCU) assembler 512. The system 500 also may decode the resulting data using a decoding loop employed depending on the coding mode indicated in syntax of the bitstream and implemented via prediction mode switch or selector 522, and either a first path including an intra prediction module 520 or a second path that is an inter-prediction decoding path including one or more filters 514. The second path may have a decoded picture buffer 516 to store the reconstructed and filtered frames for use as reference frames as well as to send off the reconstructed frames for display or storage for later viewing or another application or device.

A motion compensated predictor 518 utilizes reconstructed frames from the decoded picture buffer 516 as well as motion vectors from the bitstream to reconstruct a predicted block. Thus, the decoder does not need its own motion estimation unit since the motion vectors are already provided, although it still may have one. A prediction modes selector 522 sets the correct mode for each block, and a PU assembler (not shown) may be provided at the output of the selector 522 before the blocks are provided to the adder 510. The functionality of modules described herein for systems 400 and 500, except for the units related to the monitor unit 452 and per-frame parameter quality control unit 454 for example and described in detail below, are well recognized in the art and will not be described in any greater detail herein.

Figure 6A:
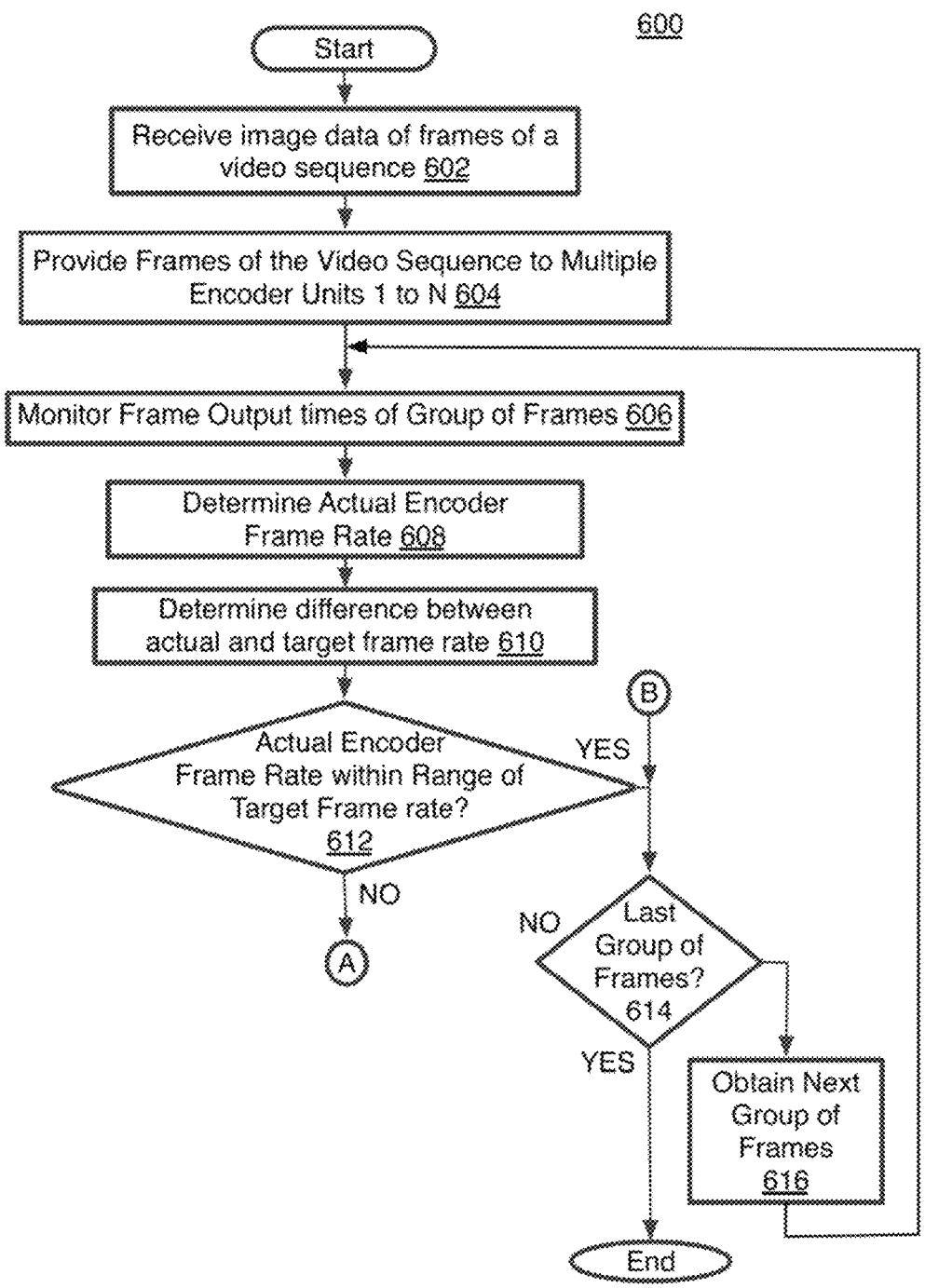

Referring now to FIGS. 6A-6B, an example process 600 is arranged in accordance with at least some implementations of the present disclosure. In general, process 600 may provide a computer-implemented method of hardware accelerated video coding with per-frame parameter control, and in the case of process 600, the parameter is frame rate or capacity of a multi-encoder unit system. In the illustrated implementation, process 600 may include one or more operations, functions or actions as illustrated by one or more of operations 602 to 630 generally numbered evenly. By way of non-limiting example, process 600 may be described herein with reference to operations discussed with respect to FIGS. 1, 3-5, and 11 herein and may be discussed with regard to example systems 100, 300, 400, 500, or 1100 discussed below.

Process 600 may include "receive image data of frames of a video sequence" 602, and particularly, a system or device may have a camera to record a video in the first place, or retrieve a video from memory whether from volatile or non-volatile memory. Video in raw data form may be pre-processed including de-mosaicing, de-noising, and so forth until it is placed in an input buffer and ready and accessible for compression operations.

Process 600 may include "provide frames of the video sequence to multiple encoder units 1 to N" 604. Specifically, an accelerator or graphics processing unit as described above which may perform a number of encoding operations on different frames in parallel. By one form, frames from multiple video sequences may be delivered to multiple hardware units specialized for encode as each unit becomes available for new frames. The frames may be assigned one at a time to encoder units as the encoder units have capacity. As mentioned, the multiple encoder units perform certain tasks such as bitrate control, motion estimation for interprediction, intra estimation tasks, and prediction mode decision tasks, while separate shared fixed function hardware is used to perform motion compensation, inter-prediction, forward quantization, pixel reconstruction on the decoder loop of the encoder, and entropy coding as some possible examples. The frame data is provided to, or made accessible for, the encoder units when their assigned tasks are to be performed.

Process 600 may include "monitor frame output times of group of frames" 606, or in other words, monitor the encoding-complete time of individual frames that form a defined group by one example. A group of frames is simply a representative set of frames encoded using the same parameter set whose output frame rate can be compared to a target value. By one form, the frames in a group of frames as the term is used herein may or may not be consecutive frames in coding order since the frames may be assigned to the same or different encoder units based on capacity of the encoder unit. Thus, the system could define two different types of groups of frames. A group of frames may be all frames from the same encoder unit where the frames are not necessarily consecutive in coding order as the frames exit the encoder and are placed in a bitstream (there may be interposed frames from other encoder units that are skipped and are not considered part of a group). In this case, groups of frames from different encoders may overlap as the frames exit the encoder. By one option, alternatively, the group of frames could be consecutive frames in coding order but from various encoder units. In either of these cases, the size of the groups could be pre-determined so that the frames for a group may be selected from each certain number of frames, say for each 50 frames to name a random number. By yet other alternatives, groups are not formed and every frame or every frame at some interval or random sampling is tested.

Process 600 may include "determine actual encoder frame rate" 608. There may be a number of different acceptable ways to determine a frame rate of one or more frames being encoded. By one approach, the frame rate for a single frame is determined as the time interval between the current frame and the next frame (or previous frame). The actual frames per second does not need to be calculated by dividing one second by the interval since each interval corresponds to a rate (a 33 ms interval corresponds to about 30 FPS for example) although the FPS could be computed anyway. By one form, once each or multiple frame rates (or intervals) are determined for a group of frames defined above, the minimum frame rate (which may be represented by the maximum interval) among the frame rates from the frames in the group of frames is used as the actual frame rate to compare to a desired target frame rate. Alternatively, the frame rate (or interval) could be calculated by determining an average or other combination frame rate (or interval) for the entire group of frames and use this average to compare to a target average FPS (or interval). Another possible way is to determine an average, combination or minimum frame rate (or interval) for each frame using a certain number of frames before and/or after each frame thereby establishing rolling or overlapping groups of frames. For example, the FPS of a current frame is the minimum or average with the FPS of five (or some other number) frames before and after the current frame. This is repeated for each frame. Many other examples are possible. The result is an actual frame rate for comparison to a target frame rate.

The process 600 may include "determine difference between actual and target frame rate" 610. By one form the target FPS may be selected based on the acceptable speed of an expected display device, such as 30 FPS for live display with low latency and minimal buffering. Alternatively, the target frame rate can be different depending on the type of content such as video of a movie, live teleconference, delivery of a virtual desktop interface (VDI) on a computer or smartphone screen, animation or graphics such as for gaming, and so forth. The target rate should be arbitrarily configurable as delivered frame rate capability can be a method of product differentiation. Pre-recorded content records playback frame rate in its metadata, and live streaming frame rate for videoconferencing, VDI, games, etc. is often negotiated between sender and receiver based on network conditions. Once the actual frame rate value and the target frame rate value (whether actual FPS values or represented by interval values) are obtained, they are subtracted to obtain a difference.

The process 600 may include the inquiry "actual encoder frame rate within range of target frame rate?" 612. When the difference is within an acceptable range (such as 1 ms by one example), then the frame rate is maintained and no adjustments are implemented. In this case, the process 600 then may include the inquiry "last group of frames?" 614 to determine whether another group of frames is in the video sequence being analyzed. If the current group of frames is the last group of frames of the video sequence, the process ends. If not, the process 600 then may include "obtain next group of frames" 616, whereupon the process loops back to operation 606 and the system begins monitoring the next group of frames obtained for encoding.

Otherwise, when the difference between the actual and target frame rate or representation of the frame rate is not within an acceptable range from the target, the process 600 may include the inquiry "actual encoder frame rate greater than target frame rate?" 618. When the actual frame rate is greater than the target frame rate, the system is operating too fast, and there is sufficient capacity to slow the frame rate to a rate that is still acceptable while increasing the quality of the images. The opposite also is true. When the actual frame rate is below the target frame rate, the system is operating too slow, risking delays at the decoder. In this case, the frame rate should be increased and the quality of the images should be decreased within acceptable limits.

Figure 7:
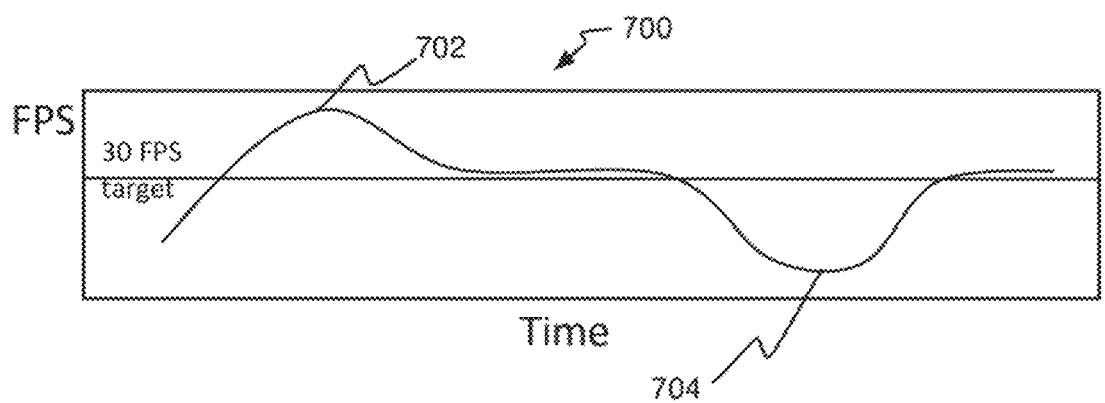
FIG. 7 is a graph for adjusting frame rate to meet a target frame rate according to the implementations herein.

This relationship is shown on graph 700 (FIG. 7) and shows the variation in frame rate over time where the frame rates are each the minimum frame rate for a group of frames being encoded, and the target frame rate here is 30 FPS. As shown on the graph, when the frame rate falls below the target frame rate, the frame rate should be increased by decreasing the encoder quality settings to move the actual frame rate to or toward the target frame rate, and where the frame rate is above the target frame rate, the quality of the frames should be increased to lower the frame rate toward or to the target frame rate.

Thus, the process 600 may include "change at least one encoder setting to increase image quality" 620 when the actual frame rate is above the target frame rate. Alternatively, the process 600 may include "change at least one encoder setting to decrease image quality" 626 when the actual frame rate is below the target frame rate. These adjustments can be implemented in a variety of ways. By one form, each encoder unit is adjusted separately. This involves tracking the frame rate and quality/performance tradeoff setting for each encoder.

By an alternative, if any one of the encoder units has a frame rate that is below or above the target frame rate (outside of the range mentioned above by one example), then the quality/performance tradeoff setting for all encoders in the group use the same setting. If the actual frame rate is greater than the target frame rate, then the image quality of all of the encoder units is increased, and vice-versa. By another alternative, all or multiple encoder units are adjusted when the frame rate is consistently too high or too low for a certain number of frames or over a certain amount of time. These alternatives may or may not be limited to those encoder units that provide a frame to a group of frames being analyzed.

By one form, the system may be set to adjust a single encoder feature setting. This may be an inter-prediction, intra-prediction, or quantization related setting, or any of the other encoder feature settings mentioned herein or otherwise that can be adjusted for encoding.

By another alternative form, multiple encoder settings are grouped together to form a spectrum of quality performance tradeoff options. At one end is a collection of settings indicating highest algorithm complexity, meaning lowest output frames per second but highest quality. At the other is the reverse: a group of options representing a minimum of complexity but also lowest quality. By one example form, there are seven levels where level one is the best image quality (and slowest frame rate) and level seven provides the least image quality (and fastest frame rate). Thus, for example, process 600 may include "compare difference to quality level scale" 622, where the scale may range from low to high FPS. Since actual output FPS is not constant and varies by content, the feedback mechanism described here is required to manage it to maximize quality with constrained output frame rate.

The process 600 then may include "set quality level among range of available quality levels based on scale value" 624. Thus, when the output frame rate differs from the target FPS, more than the specified tolerance an adjustment to the quality/performance tradeoff setting is triggered. These same operations may apply whether the actual value is greater or less than the target value, except that the encoder settings may be set at different levels (to increase quality versus decrease quality) depending on whether the actual value is greater or less than the target value.

Once the quality level is set, the process 600 may include "adjust encoder settings" 628. As mentioned, this may include adjusting a single encoder setting or optionally may include "adjust encoder settings to pre-determined settings of set quality level" 630. The encoder settings to be adjusted may include the following, and may or may not be an adjustment at the individual encoder units as described below.

A number of encoder settings may be related to motion estimation during inter-prediction and are applied directly to the encoder units (or more precisely, applied to the instructions for operating the encoder unit). This may include adjusting the thoroughness of the search on a reference frame for matching blocks to form motion vectors and relative to a current block on a current frame being compressed. Some alternatives include reducing or increasing the search area on a frame purely by the pixel distance from a zero motion vector position (a position on a reference frame that is the same position as the current block being matched). Alternatively, the encoder setting may include limiting the area or size of search patterns that are to be used, limiting which patterns are to be used in hierarchical searches for example, permitting or restricting sub-pixel (or fractional) searches, and permitting searches by partition types. The partition restrictions may include searches for only certain sized blocks such as 16×16 macroblocks or 8×8 blocks but no blocks smaller than that. Many variations exist. Any setting that permits a more thorough search will use more time, and therefore slow the frame rate when desired.

Another encoder setting that is related to the motion estimation may include changing the group of pictures to be used by the motion estimator, and in turn, which frames can be used as reference frames. Thus, by one example, an encoder setting to be adjusted may be to adjust whether B-frames or frames with more than two reference frames are to be used to rebuild a current frame (or when motion estimation is based on frame portions, then to rebuild a slice or block of a frame with more than one reference frame). By one form, the encoder unit may be restricted to using only I-frames (with no temporal references) or P-frames (with a single reference frame each). Such restriction will increase the frame rate while possibly lowering matching accuracy and in turn image quality.

Other encoding settings may be adjusted such as the range and shape of the motion search algorithm, restrictions of mode search, limited mode estimation, use of adaptive quantization, etc. However, in general, these groups of options organized as preset quality/performance tradeoff levels should be presented by the encoder so they do not need to be directly managed by a specialized manager just for latency and capacity control described herein.

By one example form, an example quality level 1 may include all possible setting types to improve quality (full motion search including subpixel, full mode search, etc.) while the lowest quality level would limit motion and mode searches to a minimum without other controls for latency or capacity, or may have another single setting type that is controlled.

Figure 8A:
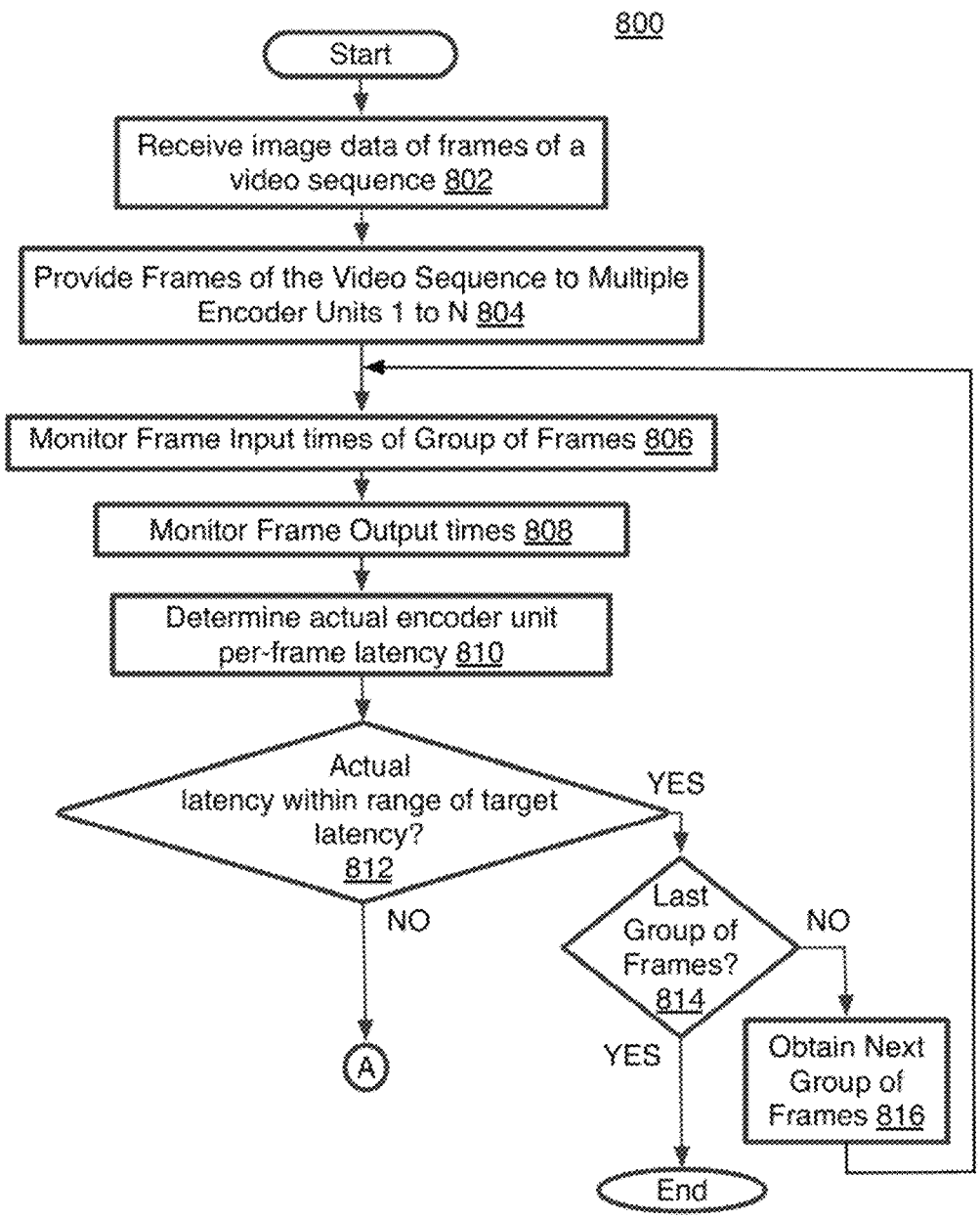
FIGS. 8A-8B is a flow chart of an alternative method of video coding with latency control according to the implementations herein.
Figure 8B:
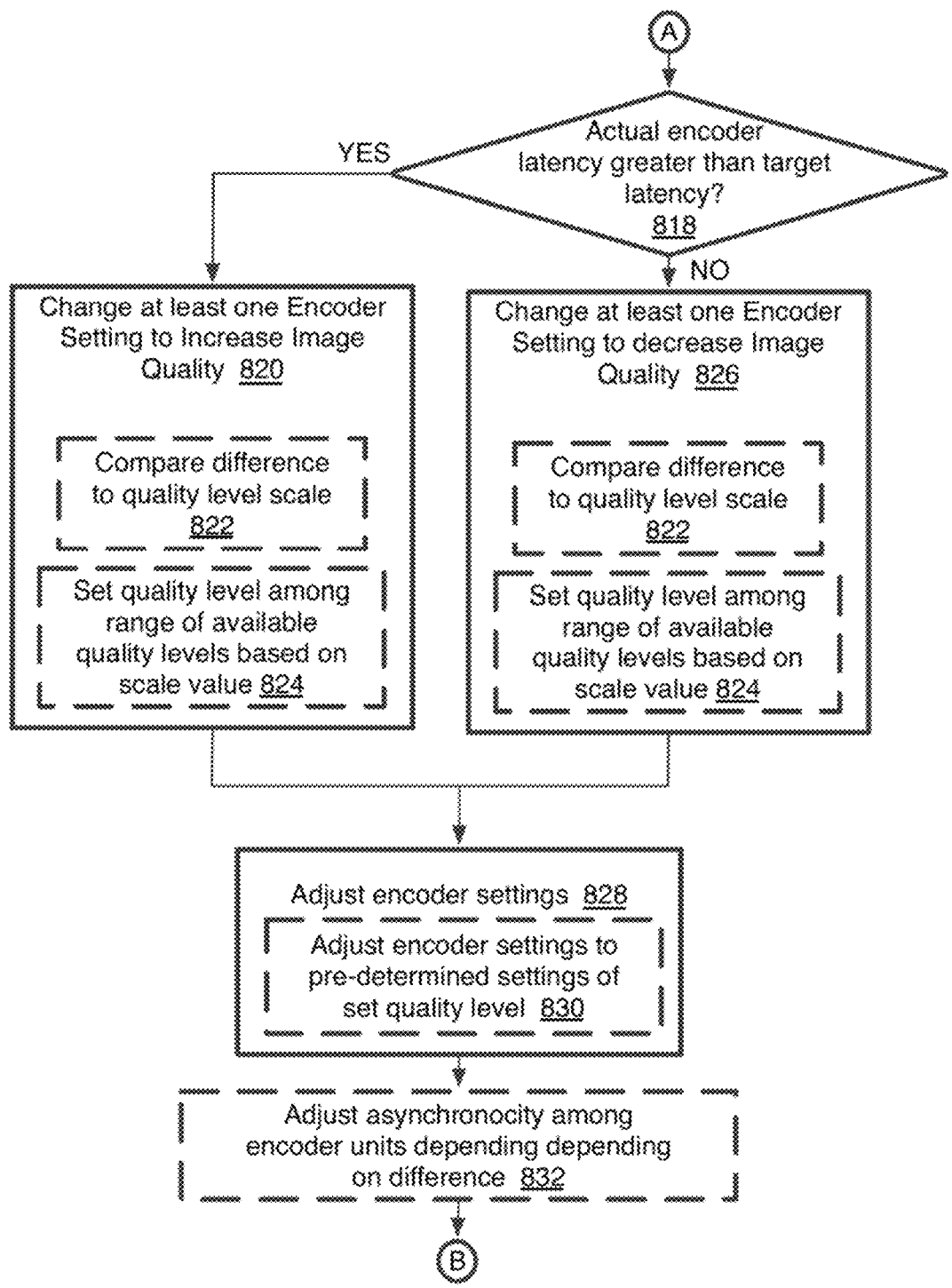

Referring now to FIGS. 8A-8B, an example method 800 of hardware accelerated video coding with per-frame parameter control is provided, and here where the parameter is latency. In the illustrated implementation, process 800 may include one or more operations, functions, or actions as illustrated by one or more of actions 802 to 832 generally numbered evenly, and used alternatively or in any combination. By way of non-limiting example, process 800 may be described herein with reference to operations discussed with respect to any of the implementations described herein.

The initial operations of process 800 including receiving image data of frames of a video sequence (802), providing frames to multiple encoder units (804), and monitoring frame output times (808) are the same or similar to those operations of process 600 such that the description of these operations need not be repeated.

Process 800 has an additional initial operation of "monitor frame input times of group of frames" 806. In this case, the encoding-start time is determined for each or individual frames of a group of frames as described above. The encoding-start time may be measured from the time a frame is pre-processed sufficiently to be ready at an input buffer for main or core encoding. In other words, the frames are in a condition that is ready to be retrieved out of display order and in coding order to be provided to a partition unit that divides the frame into slices and/or prediction blocks, or similar units. Other format transformations performed to place the frame in a condition compatible with the encoding process, such as color space, resolution size, or dynamic range transformations, may be considered to occur before or after the frame is retrieved at the encoding-start time. Other variations are possible where the encoding-start time may be defined before or after other certain pre-processing operations such as de-mosaicing, other chroma or luminance value conversions, color temperature conversions, vignette elimination, temporal de-noising, image sharpening, color sub-sampling standard conversions, and so forth.

Thus, the encoding-start time corresponds to when a frame pointer is passed to the encoder. This is not necessarily when an encoder unit of the accelerator receives the frame data, just when the frame should be considered "locked" since the encode process may start at any time after this point. This is the same with the encoding-compete time, which is when the frame buffer and output bitstream can be considered "unlocked" and unambiguously finished rather than exiting at the parallel encoder units themselves.

Process 800 may include "determine actual encoder unit per-frame latency" 810. Also as mentioned herein, the latency value is the difference between the encoding-start time and the encoding-complete time for an encoding session that uses a particular encoder unit (or otherwise when a particular frame begins the encoding process and when it is available in the output bitstream). Also as mentioned, each encoding session includes the use of one of the encoder units for at least one but here a number of encoding operations related to bitrate control, motion estimation, intra estimation, and prediction mode selection, but could be other encoder operations. In any of these cases, a double ended queue of latency and encode times is stored. New values are added to one end and values are popped from the other end when they are too old to be relevant to the algorithm watching for trends above or below the target FPS or latency.

If a latency target is set, the actual latency is determined by obtaining the latency for a group of frames defined above with frame rate and from the same encoder unit, and whether or not a group of frames includes consecutive frames and/or frames from the same single encoder unit. The difference here for this example, however, is that the encode with the maximum latency trend is used to determine if the quality/performance tradeoff setting is adjusted rather than the encoder with the minimum frame rate. The latency may be provided as an ms duration value.

Once the actual latency is determined, process 800 may include a query "actual latency within range of target latency?" 812. Similar to the frame rate process, if the actual latency is at or within an acceptable range of the target latency, such as ±1 ms for example, then the process loops to determine whether the current group of frames is the "last group of frames?" 814, and of a video sequence being analyzed. If so, the process ends, coding of frames is completed, and coded frames not already transmitted in the bitstream are sent. If not, the process continues with obtain next group of frames" 816 and loops back to operation 806 to begin monitoring the next group of frames.

Otherwise, when the actual latency is not within an acceptable range of the target latency, process 800 may continue with another inquiry, "actual latency greater than target latency?" 818. When the actual latency is greater than the target latency, the system or encoder unit is taking too long, and the quality of the images should be decreased. Likewise, process 800 also may include "change at least one encoder setting to increase image quality" 820 when the actual latency is less than the target latency, or "change at least one encoder setting to decrease image quality" 826, when the actual latency is greater than the target latency. It will be understood that the encoder setting that is changed may or may not be a setting at the individual encoder units.

Figure 9:
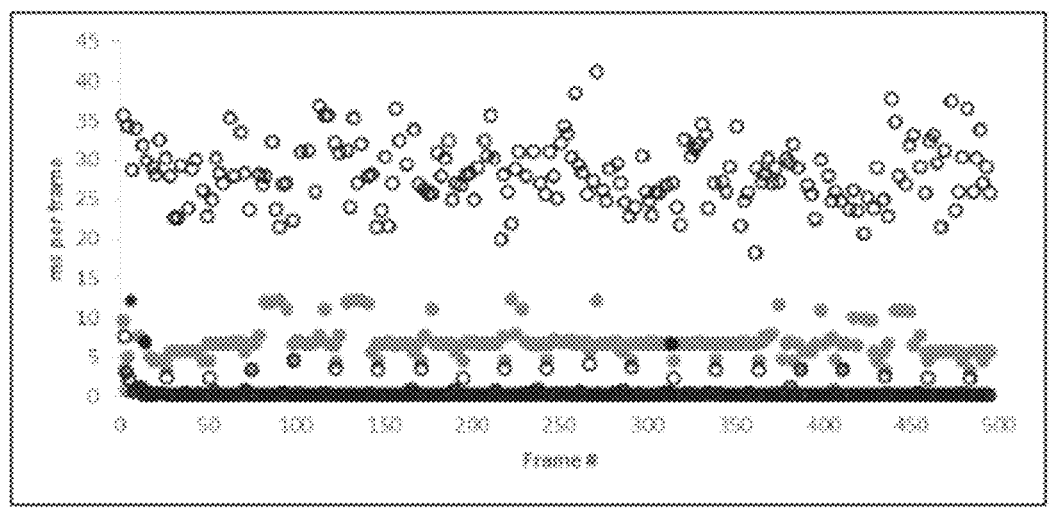
FIG. 9 is a graph for adjusting latency to meet a target latency according to the implementations herein.

Referring to FIG. 9, a graph 900 shows that as a graphics accelerator, and in turn the encoder units, become busier with multiple parallel encoder sessions, the latency at each frame increases to about 20-40 ms, and when the accelerator is not busy, such as when only a single encoder unit is needed, the latency drops to about 0 to 10 ms. While output FPS can be managed as an average within a window of time, latency can be managed as a configurable count of frames exceeding the latency threshold within that window. If the count of latencies exceeding the threshold is higher than the configured cutoff encode quality is adjusted down. Conversely, if there are no latencies close to exceeding the threshold, then the quality/performance tradeoff setting can be incremented toward more quality.

Once the difference between an actual latency and target latency is determined (including which is greater and by how much), the system can adjust based on preset numeric quality/performance tradeoff settings such as the one to seven scale described above.

Thus, as with the frame rate changes, process 800 for latency may include "adjust encoder settings" 828. This operation may include "adjust encoder settings to predetermined settings of set quality level" 830, and as already described for frame rate. Accordingly, the same application of encoder setting adjustments to all or multiple encoder units and/or to individual encoder units applies equally as well here for latency as with frame rate.

An additional adjustment for latency may be provided where process 800 may include "adjust asynchronicity among encoder units depending on difference" 832. This refers to adjusting the capacity of the buffer that holds the frame data during encoding. This may be considered a part of the input buffer when frame data is considered to be held in the input buffer during encoding operations, or another buffer, which may or may not be in the same memory as the input buffer, may be used to hold frame data during encoding operations. This may or may not be considered separate from the decoded frame buffer (or reference frame buffer) on the decoding loop of the encoder and coded frame buffer holding compressed frame data ready for placement into a bitstream.

For scenarios where a target latency is specified, the asynchronicity of the encoder can be considered another variable. This is the number of encodes which can be processed simultaneously. If only one frame is allowed through the pipeline at a time, latency is minimized but so are the opportunities for parallelism. As more frames are allowed to be processed asynchronously, FPS may increase but latency will also increase. This performance and/or latency tradeoff could also be managed with this mechanism. If latency is within tolerance, increment asynchrononicity. If latencies exceed tolerance, decrement the number of frames which can be processed simultaneously.

By one form, the process targeting a latency 800 is used alternatively to the process targeting a specified frame rate. The frame rate process is considered a simpler process since only time between subsequent encodes needs to be monitored rather than the additional complexity of monitoring when individual frames enter and leave the encoder. By other alternatives, both processes may be used together. When both processes are used, a performance and/or quality tradeoff level only may be changed and selected when both processes select the same performance/quality tradeoff level. Otherwise, variations could be used where the lowest or highest quality level of the two is actually used for each adjustment. Otherwise some average setting value may be applied to individual encoder settings when latency and frame rate indicate different predetermined quality levels or different quality adjustments when predetermined levels are not used.

Figure 10:
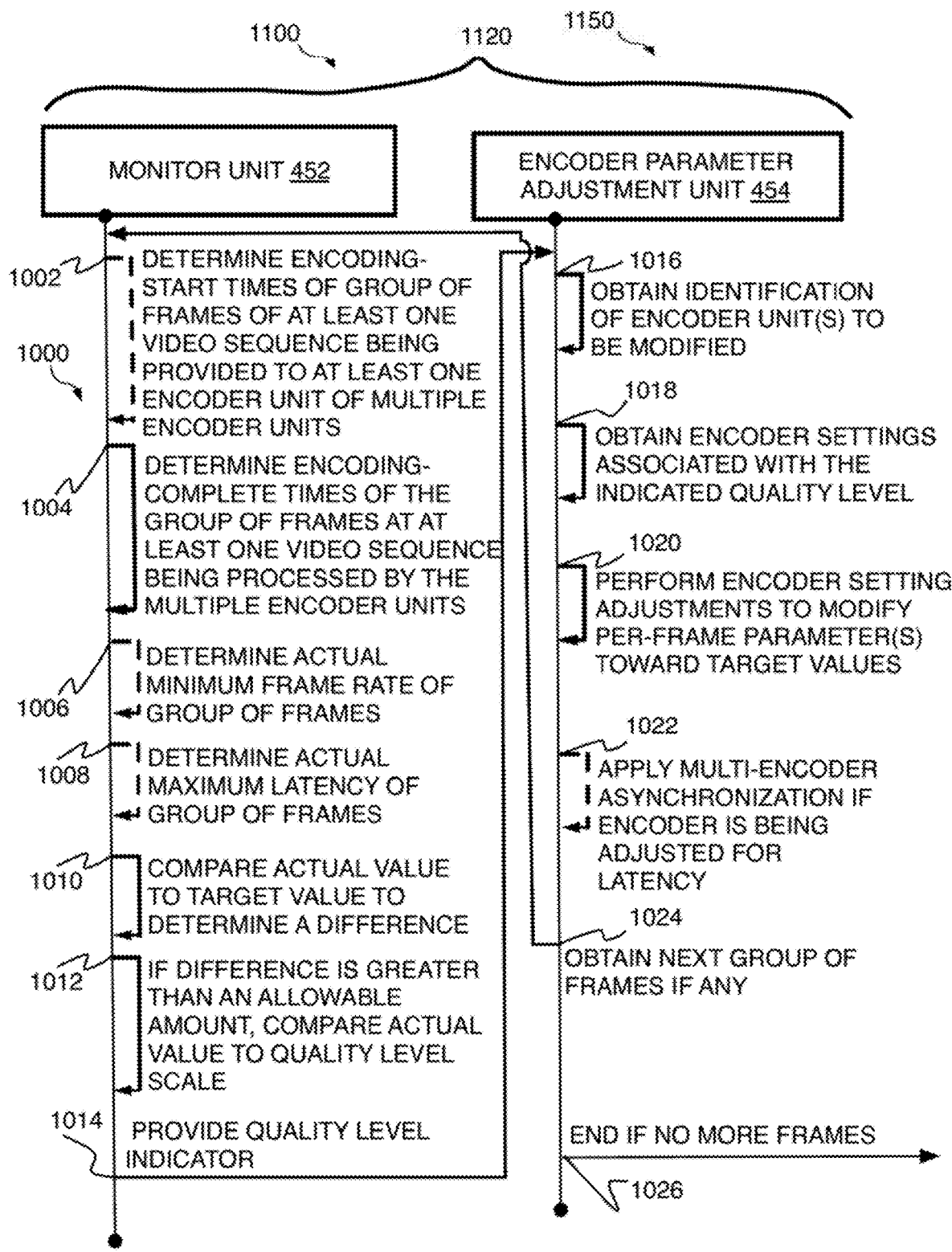
FIG. 10 is an illustrative diagram of an example system in operation for providing a method of video coding with per-frame parameter control according to the implementations herein.

Referring now to FIG. 10, a system 1100 is shown in operation of an example method 1000 of hardware accelerated video coding with per-frame parameter control. In the illustrated implementation, process 1000 may include one or more operations, functions, or actions as illustrated by one or more of actions 1002 to 1026 generally numbered evenly, and used alternatively or in any combination. By way of non-limiting example, process 1000 may be described herein with reference to operations discussed with respect to any of the implementations described herein.

In the illustrated implementation, system 1100 may include a processing unit 1120 with specialized encode hardware or modules 1150, the like, and/or combinations thereof. For one example, logic circuitry or modules 1150 may include a video encoder 1130 with a number of components the most relevant here being an encoder control 1140 that may have the per-frame parameter quality control unit 454, and the monitor unit 452 to monitor frame rate and/or latency of frames from multiple encoder units of a hardware accelerator or GPU. The per-frame parameter quality control unit 454 adjusts encoder settings depending on the frame rate and/or latencies found by the monitor unit 452. Although system 1100, as shown in FIG. 10, may include operation of one particular set of operations or actions associated with particular modules, these operations or actions may be associated with different modules than the particular module illustrated here.

Process 1000 may optionally include "determine encoding-start times of group of frames of at least one video sequence being provided to at least one encoder unit of multiple encoder units" 1002, where the system may determine the encoding-start times when latency is to be monitored for individual frames. This also may include defining groups of frames so that a representative actual latency may be computed that represents the group of frames as described above. As mentioned, this may include noting the time a frame is retrieved from an input buffer or other memory in coding order for core encoding operations which may start with partitioning of the frames but could also include format conversions (such as color space, dynamic range, etc.). The details are provided above.

Process 1000 may include "determine encoding-complete times of the group of frames at at least one video sequence being processed by the multiple encoder units" 1004, and this may include determining when a frame is fully compressed, by entropy coding for example, and the data of the frame is ready to be packeted and/or placed in a bitstream. This is performed for both frame rate (capacity) determination and for latency.

Process 1000 may include "determine actual minimum frame rate of group of frames" 1006. This is applied when the frame rate will be used to adjust encoder performance/quality tradeoff settings. By one form, the frame rate is determined by determining the time interval between the encoding-complete time of the current frame and the encoding-complete time of the next frame as explained above. When one second is divided by the time interval, this obtains an FPS value. As mentioned above, however, the frame rate may be represented by the interval itself without the division step. This option for computing the frame rate of individual frames and other options are explained above. Once frame rates are determined for individual frames, the minimum frame rate among frame rates of a defined group of frames may be used as the actual frame rate to represent the group of frames for comparison to a target frame rate. Again, other alternatives could be used such as an average or other combination of frame rates for comparison to a target frame rate.

Process 1000 may include "determine actual maximum latency of group of frames" 1008. Alternatively, or additionally, when latency is used to adjust encoder settings, the difference between the encoding-start time and the encoding-complete-time of the same frame is used as the latency for that individual frame. The maximum latency of a defined group of frames may be the actual latency that is compared to a target latency for that group of frames.

Process 1000 may include "compare actual value to target value to determine a difference" 1010, and as mentioned, the actual frame rate or actual latency for a group of frames is then compared to a target value. The target values are determined as explained above, and when the actual value is sufficiently close to the target value (within some +/−range for example), then no adjustment is made. Otherwise, the encoder settings will be adjusted as follows.

Process 1000 may include "if difference is greater than an allowable amount, compare actual value to quality level scale" 1012. The difference here refers to the difference between the actual and target value, and whether it falls within an acceptable range. By one approach, if not, the difference is compared to a scale of differences that define a number of predetermined quality levels (here seven quality levels mentioned above). Each quality level may correspond to a range of difference values, when a difference falls within the difference value range of one of the quality levels, that quality level is indicated for the system to modify the encoder settings to the setting values of the encoder setting types associated with that quality level. As mentioned, each quality level may have different encoder setting types (or different features) and/or may have different setting values for the same encoder setting type at different levels. Many examples are explained above.

Process 1000 may continue with "provide quality level indicator" 1014, where the monitor unit provides the indicated predetermined performance/quality tradeoff level, and process 1000 may include "obtain identification of encoder unit(s) to be modified" 1016. Here, the system obtains the identification of which encoder units of the GPU or accelerator are to be adjusted when the process includes the adjustment of encoder settings according to preset performance/quality levels of individual encoder units that could be different than settings of other encoder units on the same accelerator. The time between frame encodes as well as the frame latency can be held in a double ended queue as described above.

Process 1000 may include "obtain encoder settings associated with the indicated quality level" 1018. Thus, the system may determine or otherwise obtain each of the settings of each of the encoder setting types associated with the indicated quality level. As mentioned above, this may be applied whether an inter-prediction, intra-prediction, quantization, bitrate conformance, or other encoder setting.

Process 1000 then may include "perform encoder settings adjustments to modify per-frame parameter(s) toward target values" 1020, and the encoder settings are then adjusted whether applied from a predetermined quality level or not, and whether applied to individual encoder units or applied to all encoder units as described above.

Process 1000 then may include "apply multi-encoder asychronization if encoder is being adjusted for latency" 1022. Thus, the system may vary the frame capacity of the input or other buffer or memory holding the frame data during encoding operations (where different versions of the frame in different stages are stored for example). By one approach, when the latency is too small, the frame capacity of the buffer is increased (to hold more frames) to allow the system to be more thorough by analyzing more frames and thereby slowing the frame rate but increasing the image quality. When the latency is too large, the system may decrease the buffer frame capacity so that it drops more frames thereby decreasing image quality but increasing the frame rate. The details are explained above.

Process 1000 then may include "obtain next group of frames if any" 1024, and the process loops back to operation 1002 when more groups of frames to encode exist. Otherwise, process 1000 then may include "end if no more frames" 1026, where the process may end, and encoding is completed until the end of the video is reached.

While implementation of example process 200, 600, 800, and/or 1000 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems unless limited to a certain form as discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. Unless limited as described above as being part of an encoder unit or a certain part of the graphics accelerator discussed above, one of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
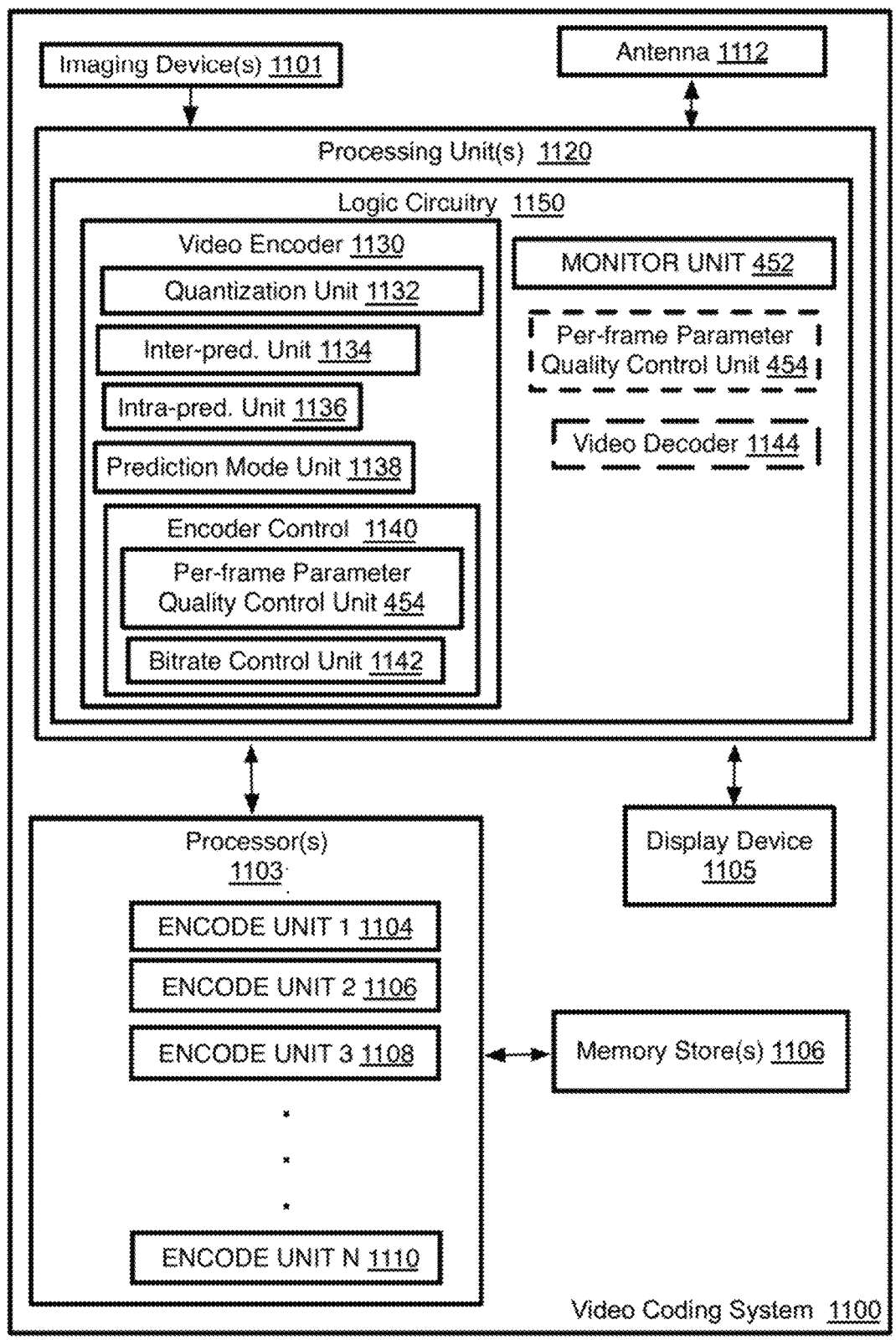
FIG. 11 is an illustrative diagram of an example system.

Referring to FIG. 11, an example image processing system (or video coding system) 1100 for providing hardware accelerated video coding with per-frame parameter control may be arranged in accordance with at least some implementations of the present disclosure. In the illustrated implementation, system 1100 may include one or more central processing units or processors 1103 including fixed function hardware as well as encoder units 1 to N (1104 to 1110 for example). Also, processing unit(s) 1120 may provide an encoder 1130 similar to encoder 400, and decoder 1144 similar to decoder 500 and as discussed herein, one or more imaging devices 1101 to capture images, an antenna 1112 to receive or transmit image data, a display device 1105, and one or more memory stores 1106. Processor(s) 1103, memory store 1104, and/or display device 1105 may be capable of communication with one another, via, for example, a bus, wires, or other access. In various implementations, display device 1105 may be integrated in system 1100 or implemented separately from system 1100.

As shown in FIG. 11, and discussed above, the processing unit 1120 may have logic circuitry 1150 with an encoder 1130 and optionally with a decoder 1144. The encoder 1130 may have a quantization unit 1132, an inter-prediction unit 1134, an intra prediction unit 1136, prediction mode unit 1152, encoder control 1140 with a per-frame parameter quality control unit 454 and bitrate control unit 1142. It will be understood that the per-frame parameter quality control unit 454 could be considered separate from the encoder 1130. The logic circuitry 1150 also may include monitor unit 452. These units of the logic circuitry provide many of the functions described herein and as explained with the processes described herein.

As will be appreciated, the modules illustrated in FIG. 11 may include a variety of software and/or hardware modules and/or modules that may be implemented via software or hardware or combinations thereof unless limited by the discussion of multiple encoder units described above. For example, the modules may be implemented as software via processing units 1120 or the modules may be implemented via a dedicated hardware portion such as those described by graphics processing unit or accelerator 300. Also, system 1100 may be implemented in a variety of ways. For example, system 1100 (excluding display device 1105) may be implemented as a single chip or device having an accelerator or a graphics processor unit (GPU) such as that described by accelerator 300 which may or may not have or be accompanied by image signal processors (ISPs), a quad-core central processing unit, and/or a memory controller input/output (I/O) module. In other examples, system 1100 (again excluding display device 1105) may be implemented as a chipset or a system on a chip (SoC). The structure is not particularly limited except to provide the multiple encoder units on an accelerator or graphics processing unit as described above. It will be understood antenna 1102 could be used to receive image data for encoding as well.

Otherwise, in addition to an accelerator with the multiple encoder units, the processor(s) 1103 may include any suitable implementation including, for example, microprocessor(s), multicore processors, application specific integrated circuits, chip(s), chipsets, programmable logic devices, graphics cards, integrated graphics, general purpose graphics processing unit(s), fixed function GPUs, other accelerators, or the like. As mentioned, the implementation is not limited as long as the multiple encoder units are provided on a single die or a system on a chip type of arrangement.

In addition, memory stores 1104 may be any type of memory such as volatile memory (e.g., Static Random Access Memory (SRAM), Dynamic Random Access Memory (DRAM), etc.) or non-volatile memory (e.g., flash memory, etc.), internal caches, and so forth. In a non-limiting example, memory stores 1004 also may be implemented via cache memory.

In various implementations, the example video coding system 1100 may use the imaging device 1101 to form or receive captured image data. This can be implemented in various ways. Thus, in one form, the image processing system 1100 may be one or more digital cameras or other image capture devices, and imaging device 1101, in this case, may be the camera hardware and camera sensor software, module, or component 1150. In other examples, video coding system 1100 may have an imaging device 1101 that includes or may be one or more cameras, and logic modules 1150 may communicate remotely with, or otherwise may be communicatively coupled to, the imaging device 1101 for further processing of the image data.

Thus, video coding system 1100 may be, or may be part of, or may be in communication with, a smartphone, tablet, laptop, or other mobile device such as wearables including smart glasses, smart headphones or headsets, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1101 may include camera hardware and optics including one or more sensors as well as auto-focus, zoom, aperture, ND-filter, auto-exposure, flash, and actuator controls. The imaging device 1101 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1101 may be provided with an eye tracking camera. Otherwise, the imaging device 1101 may be any other device that records, displays or processes digital images such as video game panels or consoles, set top boxes, and so forth.

As illustrated, any of these components may be capable of communication with one another and/or communication with portions of logic modules 1150 and/or imaging device 1101. Thus, processors 1103 may be communicatively coupled to both the image device 1101 and the logic modules 1150 for operating those components. Although image processing system 1100, as shown in FIG. 11, may include one particular set of blocks or actions associated with particular components or modules, these blocks or actions may be associated with different components or modules than the particular component or module illustrated here.

Figure 12:
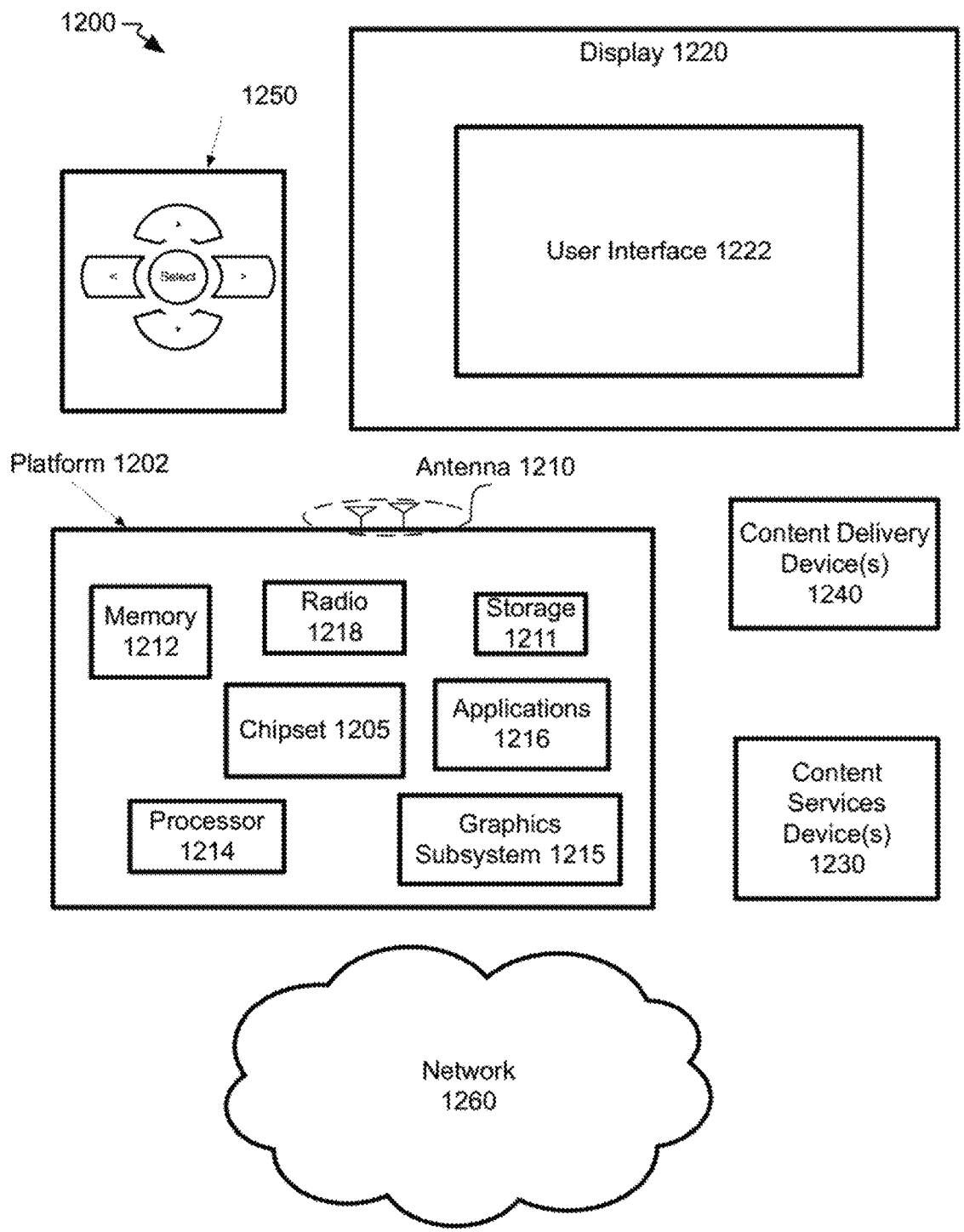
FIG. 12 is an illustrative diagram of another example system.

Referring to FIG. 12, an example system 1200 in accordance with the present disclosure and various implementations may embody system 1100 for example, and may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1200 includes a platform 1202 communicatively coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, storage 1214, graphics subsystem 1215, applications 1216 and/or radio 1218 as well as antenna(s) 1211. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU) for implementing the operations of the methods described above and by having or using a graphics processing unit (GPU) or accelerator described above. In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205. At a minimum, the graphics subsystem includes the limitations described above regarding the graphics hardware and other features.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In implementations, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for audio, for example. Drivers may include a graphics driver for integrated graphics platforms. In implementations, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth.

When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
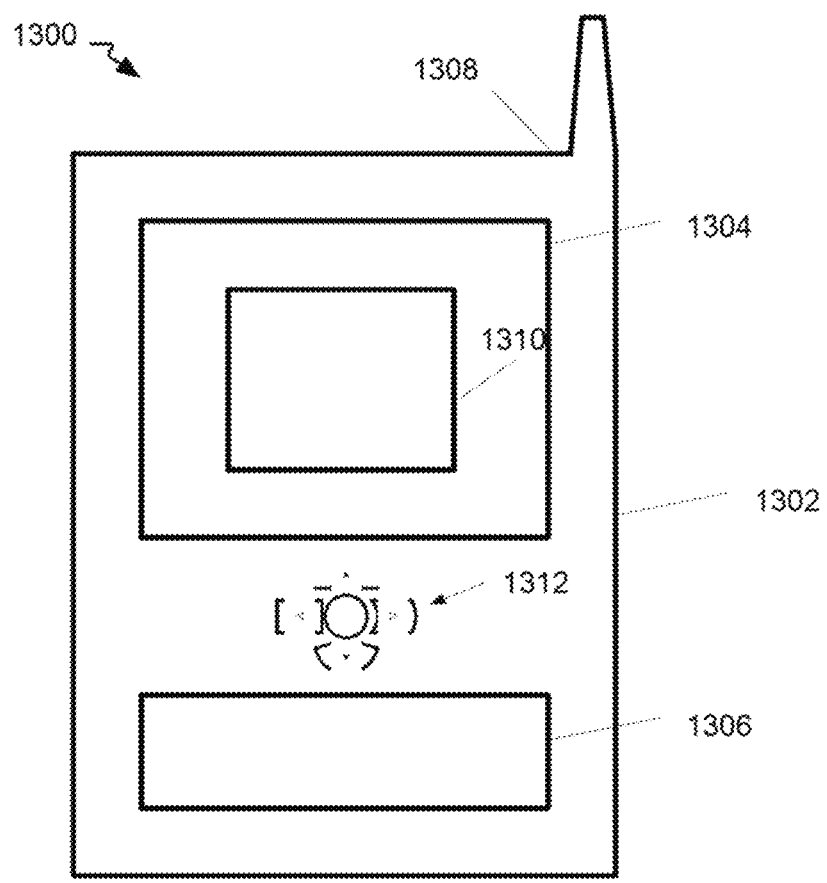
FIG. 13 illustrates another example device, all arranged in accordance with at least some implementations of the present disclosure.

As described above, system 1100 or 1200 may be implemented in varying physical styles or form factors. FIG. 13 illustrates implementations of a small form factor device 1300 in which system 1100 or 1200 may be implemented. In implementations, for example, device 1300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 13, device 1300 may include a housing 1302, a display 1304, an input/output (I/O) device 1306, and an antenna 1308. Device 1300 also may include navigation features 1312. Display 1304 may include any suitable screen 1310 on a display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method of hardware accelerated video coding with per frame parameter control that has obtaining image data of frames of at least one video sequence to be encoded; monitoring a graphics accelerator-type device having a plurality of encoder units used to perform simultaneous encoding tasks of a plurality of the frames, and to determine at least an encoding-complete time when the compression of individual frames are completed and ready to be placed in a bitstream; determine an actual per-frame encoding time related value of at least one frame and of at least one of the plurality of encoder units by using at least one of the encoding-complete times; and adjusting at least one encoder setting of at least one encoder operation to change the actual per-frame encoding time related value to be closer to or the same as a target per-frame encoding time related value.

The method also may include at least one of: (1) wherein the encoding-complete times are used to generate an average actual frame rate that is compared to a target frame rate value; and (2) the method comprising differencing the encoding-start time of individual frames from an encoding-complete time from the individual frames to generate a difference that is an actual latency for the individual frames, the method comprising comparing the actual latency to a target latency, wherein monitoring comprises determining an encoding-start time of the individual frames of the video sequence; adjusting the at least one encoder setting by adjusting encoder settings associated with a quality level of a plurality of predetermined quality levels, wherein individual quality levels are selected depending on the size of the difference between the actual per-frame encoding time related value and the target per-frame encoding time related value and which value is larger; the method comprising at least one of: (a) wherein at least one quality level adjusts a different encoder setting than the encoder setting adjusted at another quality level, (b) wherein each quality level has a different value for the same encoder setting comprising at least one of inter-prediction, intra-prediction, motion search complexity, mode search complexity, and (c) wherein each quality level has at least one setting for each of the inter-prediction, intra-prediction, motion search complexity, mode search complexity; the method comprising at least one of: (A) adjusting the encoder settings to provide increased quality frames at a slower frame rate when the actual per-frame encoding time related value is greater than the target per-frame encoding time related value and both values are related to frame rate, and (B) adjusting the encoder settings to provide increased quality frames at a longer latency duration when the target per-frame encoding time related value is greater than the actual per-frame encoding time related value and both values are related to latency of a frame; the method comprising at least one of (i) wherein adjusting encoder settings comprises adjusting the encoder setting for multiple ones of the encoder units when less than all of the multiple ones of the encoder units triggered the need for the adjustment, and (ii) wherein adjusting encoder settings comprises adjusting the encoder settings separately for individual encoder units depending on whether an encoder unit triggered the need for an adjustment.

By another approach, a computer-implemented system comprising: at least one memory to store image data of frames of a video sequence to be encoded; at least one processor of a graphics accelerator device communicatively coupled to the at least one memory, and having a plurality of encoder units to perform simultaneous encoding tasks of a plurality of frames; a monitor unit operated by the at least one processor and to monitor the graphics accelerator-type device to determine at least an encoding-complete time when the compression of individual frames are completed and ready to be placed in a bitstream, and to determine an actual per-frame encoding time related value of at least one frame and of at least one of the plurality of encoder units by using at least one of the encoding-complete times; and a per-frame parameter quality control unit operated by the at least one processor and to operate by adjusting at least one encoder setting of at least one encoder operation to change the actual per-frame encoding time related value to be closer to or the same as a target per-frame encoding time related value.

The system also may include wherein the actual per-frame encoding time related value is at least one of (1) an average frame rate at an encoder unit determined by using the encoding-complete times of multiple frames processed by an encoder unit, and (2) a latency that is a difference between the encoding-complete time and an encoding-start time of the same frames with the encoding-complete times; the system also may include at least one of: (A) wherein the per-frame parameter control unit is to operate by reducing or increasing the quality of frames of all encoder units when any one encoder unit has an actual per-frame encoding time related value that is not within a predetermined range of the target encoding time related value, (B) wherein adjusting comprises adjusting the encoder settings separately for individual encoder units, and (C) wherein adjusting comprises increasing the quality for multiple encoder units until an actual per-frame encoding time related value of the slowest encoder unit of the multiple encoder units is within a predetermined range of the target encoding time related value; wherein adjusting comprises adjusting an inter-prediction setting comprising at least one of: (a) permitting or limiting the use of B-frames, and (b) changing the exhaustiveness of the block matching search including at least one of: (1) determining whether sub-pixel searches can be used, (2) limiting searches by partition type, by frame area, or number of stages in hierarchical searches, and (3) using weighted predictions by the use of scaling of offsets when applying motion vectors, and (c) wherein adjusting comprises modifying a frame capacity of a buffer that holds frame data; wherein the adjusting comprises adjusting the at least one encoder setting by adjusting encoder settings associated with a quality level of a plurality of predetermined quality levels, wherein individual quality levels are selected depending on the size of the difference between the actual per-frame encoding time related value and the target per-frame encoding time related value and which value is larger; wherein each quality level has a different value for the same encoder setting comprising at least one of inter-prediction, intra-prediction, motion search complexity, mode search complexity; and wherein adjusting encoder settings comprises adjusting the encoder settings separately for individual encoder units depending on whether an encoder unit triggered the need for an adjustment.

By another implementation, a computer-readable medium having stored thereon instructions that when executed cause a computing device to operate by: obtaining image data of frames of at least one video sequence to be encoded; monitoring a graphics accelerator-type device having a plurality of encoder units used to perform simultaneous encoding tasks of a plurality of the frames, and to determine at least an encoding-complete time when the compression of individual frames are completed and ready to be placed in a bitstream; determine an actual per-frame encoding time related value of at least one frame and of at least one of the plurality of encoder units by using at least one of the encoding-complete times; and adjusting at least one encoder setting of at least one encoder operation to change the actual per-frame encoding time related value to be closer to or the same as a target per-frame encoding time related value.

The computer-readable medium also may include wherein the actual per-frame encoding time related value at least one of: related to a frame rate at associated with one of the encoder units, and a latency that is a difference between the encoding-complete time and an encoding-start time of the same frame with the encoding complete time; wherein adjusting comprises adjusting the at least one encoder setting by adjusting encoder settings associated with a quality level of a plurality of predetermined quality levels, wherein individual quality levels are selected depending on the size of the difference between the actual per-frame encoding time related value and the target per-frame encoding time related value and which value is larger; wherein each quality level has a different value for the same encoder setting comprising at least one of inter-prediction, intra-prediction, motion search complexity, mode search complexity, and wherein adjusting encoder settings comprises adjusting the encoder settings separately for individual encoder units depending on whether an encoder unit triggered the need for an adjustment.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video coding comprising:
    obtaining image data of frames of at least one video sequence to be encoded;
    monitoring, by at least one processor, a graphics accelerator having a plurality of hardware slices or sub-slices each having an encoder unit used to perform simultaneous encoding tasks of a plurality of the frames at least including motion estimation and intra estimation, wherein the graphics accelerator has shared hardware shared by the encoder units to perform at least some encoding tasks including at least motion compensation and entropy coding,
    determining an encoding-start time that indicates a time point in processing of a current frame without calculations depending on a processing time point of a previous frame;
    determining an encoding-complete time that indicates an end of encoding the current frame at the output of entropy encoding shared by the encoder units;
    determining, by at least one processor, an actual latency value of at least one frame and of at least one of the plurality of encoder units by differencing the encoding-start time and the encoding-complete time; and
    adjusting, by at least one processor, at least one encoder setting of at least one encoder operation to change a latency value of the actual latency to be closer to or the same as a target per-frame encoding time related value.

2. The method of claim 1 wherein the encoding-complete times are used to generate an average actual frame rate that is compared to a target frame rate value.

3. The method of claim 1 wherein the encoding-start time indicates at least one of:
    a time of saving a version of the current frame in an input buffer,
    a time of retrieving a version of the current frame from the input buffer,
    a time of retrieving the current frame from a buffer to begin partitioning the frame for further encoding operations, and
    a time related to converting a format of the current frame to be compatible with the encoder unit.

4. The method of claim 1 comprising adjusting the at least one encoder setting by adjusting encoder settings associated with a quality level of a plurality of predetermined quality levels, wherein individual quality levels are selected depending on the size of the difference between an actual per-frame encoding time related value that is the actual latency value or a frame rate based on the encoding-complete times and the target per-frame encoding time related value and which per-frame encoding time related value is larger.

5. The method of claim 4 wherein at least one quality level adjusts a different encoder setting than the encoder setting adjusted at another quality level.

6. The method of claim 4 wherein each quality level has a different value for the same encoder setting comprising at least one of inter-prediction, intra-prediction, motion search complexity, mode search complexity.

7. The method of claim 6 wherein each quality level has at least one setting for each of the inter-prediction, intra-prediction, motion search complexity, mode search complexity.

8. The method of claim 1 comprising adjusting the encoder settings to provide increased quality frames at a slower frame rate when an actual per-frame encoding time related value is greater than the target per-frame encoding time related value and both values are related to frame rate.

9. The method of claim 1 comprising adjusting the encoder settings to provide increased quality frames at a longer latency duration when the target per-frame encoding time related value is greater than the actual per-frame encoding time related value and both values are related to latency of a frame.

10. The method of claim 1 wherein adjusting encoder settings comprises adjusting at least one of inter-prediction, intra-prediction, motion search complexity, mode search complexity.

11. The method of claim 1 wherein adjusting encoder settings comprises adjusting the encoder setting for all of the encoder units when one of the encoder units triggered the need for the adjustment.

12. The method of claim 1 wherein adjusting encoder settings comprises adjusting the encoder settings separately for individual encoder units of multiple available ones of the encoder units depending on whether an encoder unit triggered the need for an adjustment.

13. The method of claim 1 wherein the individual encoder units perform at least rate control, motion estimation, intra estimation, and prediction mode selection at the slices or sub-slices, and wherein the shared hardware performs at least motion compensation, intra prediction generation, forward quantization, and entropy coding.

14. A computer-implemented system comprising:
    at least one memory to store image data of frames of a video sequence to be encoded;
    at least one processor of a graphics accelerator communicatively coupled to the at least one memory, and having a plurality of hardware slices or sub-slices each having an encoder unit to perform simultaneous encoding tasks of a plurality of frames at least including motion estimation and intra estimation, wherein the graphics accelerator has shared hardware shared by the encoder units to perform at least some encoding tasks including at least motion compensation and entropy coding;

a monitor unit operated by the at least one processor and to monitor the graphics accelerator to determine an encoding-start time that indicates a time point in processing of a current frame without calculations depending on a processing time point of a previous frame, determine at least an encoding-complete time that indicates an end of encoding the current frame at the output of entropy encoding shared by the encoder units, and to determine an actual latency value of at least one frame and of at least one of the plurality of encoder units by differencing the encoding-start time and the encoding-complete time; and a per-frame parameter quality control unit operated by the at least one processor and to operate by adjusting at least one encoder setting of at least one encoder operation to change a latency value of the actual latency to be closer to or the same as a target per-frame encoding time related value.

15. The system of claim 14 wherein the monitor unit generates multiple actual per-frame encoding time related values comprising both (1) a frame rate at an encoder unit determined by using a difference of the encoding-complete times of multiple frames processed by an encoder unit, and (2) the actual latency.

16. The system of claim 15 wherein the adjusting comprises selecting a quality level when both the frame rate and latency indicate the same quality level.

17. The system of claim 14 wherein adjusting comprises increasing the quality for multiple encoder units until an actual per-frame encoding time related value of the slowest encoder unit of the multiple encoder units is within a predetermined range of the target encoding time related value.

18. The system of claim 14 wherein adjusting comprises adjusting an inter-prediction setting comprising at least one of:

permitting or limiting the use of B-frames, and
changing the exhaustiveness of the block matching search including at least one of:
(1) determining whether sub-pixel searches can be used,
(2) limiting searches by partition type, by frame area, or number of stages in hierarchical searches; and
(3) using weighted predictions by the use of scaling of offsets when applying motion vectors.

19. The system of claim 14 wherein the adjusting comprises adjusting the at least one encoder setting by adjusting encoder settings associated with a quality level of a plurality of predetermined quality levels, wherein individual quality levels are selected depending on the size of the difference between the actual per-frame encoding time related value and the target per-frame encoding time related value and which value is larger;

wherein each quality level has a different value for the same encoder setting comprising at least one of inter-prediction, intra-prediction, motion search complexity, mode search complexity; and wherein adjusting encoder settings comprises adjusting the encoder settings separately for individual encoder units depending on whether an encoder unit triggered the need for an adjustment.

20. The system of claim 14 wherein the shared hardware comprises an entropy encoder, and wherein the monitoring is performed on image data after being entropy encoded by the shared entropy encoder to determine an encoding-complete time used to form the actual per-frame encoding time related value.

21. The system of claim 14 wherein the encoding-start time indicates at least one of:

a time of saving a version of the current frame in an input buffer, a time of retrieving a version of the current frame from the input buffer, a time of retrieving the current frame from a buffer to begin partitioning the frame for further encoding operations, and a time related to converting a format of the current frame to be compatible with the encoder unit.

22. A non-transitory computer-readable medium having stored thereon instructions that when executed cause a computing device to operate by:

monitoring, by at least one processor, a graphics accelerator having a plurality of hardware slices or sub-slices each having an encoder unit used to perform simultaneous encoding tasks of a plurality of the frames at least including motion estimation and intra estimation, wherein the graphics accelerator has shared hardware shared by the encoder units to perform at least some encoding tasks including at least motion compensation and entropy coding, determining an encoding-start time that indicates a time point in processing of a current frame without calculations depending on a processing time point of a previous frame;

determining an encoding-complete time that indicates an end of encoding the current frame at the output of entropy encoding shared by the encoder units;

determining, by at least one processor, an actual latency value of at least one frame and of at least one of the plurality of encoder units by differencing the encoding-start time and the encoding-complete time; and adjusting, by at least one processor, at least one encoder setting of at least one encoder operation to change a latency value of the actual latency to be closer to or the same as a target per-frame encoding time related value.

23. The computer-readable medium of claim 22 wherein an actual per-frame encoding time related value is associated with at least one of: a frame rate associated with one of the encoder units, and the actual latency;

wherein adjusting comprises adjusting the at least one encoder setting by adjusting encoder settings associated with a quality level of a plurality of predetermined quality levels, wherein individual quality levels are selected depending on the size of the difference between the actual per-frame encoding time related value and the target per-frame encoding time related value and which value is larger;

wherein each quality level has a different value for the same encoder setting comprising at least one of inter-prediction, intra-prediction, motion search complexity, mode search complexity.

24. The medium of claim 22 wherein the instructions cause the computing device to operate by maintaining independent processing at encode units so that the values of image data being processed by a current encode unit is not affected by another of the encode units except when waiting and using image data of another encode unit as reference frame data of a current frame being processed at the current encode unit.

25. The medium of claim 22 wherein the adjusting comprises setting a same one quality level of a plurality of predetermined quality levels at all encoding units so that the same encoding settings forming the one quality level are set at all of the encode units.

* * * * *